US009778136B2

(12) United States Patent
Suzuki et al.

(10) Patent No.: US 9,778,136 B2
(45) Date of Patent: Oct. 3, 2017

(54) LENS POWER MEASUREMENT DEVICE AND MEASUREMENT METHOD

(75) Inventors: Hiroaki Suzuki, Tajimi (JP); Atsushi Kobayashi, Seto (JP)

(73) Assignee: MENICON CO., LTD., Nagoya-shi (JP)

(*) Notice: Subject to any disclaimer, the term of this patent is extended or adjusted under 35 U.S.C. 154(b) by 53 days.

(21) Appl. No.: 14/396,489

(22) PCT Filed: May 11, 2012

(86) PCT No.: PCT/JP2012/003108
§ 371 (c)(1),
(2), (4) Date: Feb. 24, 2015

(87) PCT Pub. No.: WO2013/168201
PCT Pub. Date: Nov. 14, 2013

(65) Prior Publication Data
US 2015/0292978 A1   Oct. 15, 2015

(51) Int. Cl.
*G01B 9/00* (2006.01)
*G01M 11/02* (2006.01)
*G02C 7/04* (2006.01)

(52) U.S. Cl.
CPC .... *G01M 11/0228* (2013.01); *G01M 11/0221* (2013.01); *G02C 7/04* (2013.01)

(58) Field of Classification Search
CPC ... G02C 7/04; G02C 7/00; G02C 1/00; G02C 7/02; G02C 7/028; G02C 7/024; G01M 11/02; G01M 11/0228; G02B 27/0955
See application file for complete search history.

(56) References Cited

U.S. PATENT DOCUMENTS 6,905,209 B2   6/2005   Mihashi et al.
7,078,665 B2   7/2006   Topa
(Continued)

FOREIGN PATENT DOCUMENTS

JP   A-5-126675   5/1993
JP   A-2003-106940   4/2003
(Continued)

OTHER PUBLICATIONS

International Search Report issued in International Application No. PCT/JP2012/003108 mailed on Aug. 7, 2012.
(Continued)

*Primary Examiner* — Jamil Ahmed
(74) *Attorney, Agent, or Firm* — Oliff PLC

(57) ABSTRACT

Provided are a lens power measurement device and a lens power measurement method whereby lens power measurement results of a contact lens can be displayed in a manner which is easy to view, while maintaining fully satisfactory precision of the lens power measurement results. From lens power distribution information determined based on optical property measurement information of a contact lens, correction target information including positive and negative abnormal peaks on both sides of a lens central axis in a lens central area is selected. Lens power distribution measurement results are then obtained by applying substitution using a correction function that smoothes out the abnormal peaks to the selected correction target information to smooth the lens power measurement values.

20 Claims, 13 Drawing Sheets

(56) References Cited

U.S. PATENT DOCUMENTS

| | | | |
|---|---|---|---|
| 2004/0156013 A1 | 8/2004 | Lindacher et al. | |
| 2009/0244478 A1* | 10/2009 | Wooley | G02C 7/04 351/159.08 |
| 2013/0050638 A1* | 2/2013 | Suzaki | G02C 7/04 351/159.06 |

FOREIGN PATENT DOCUMENTS

| | | | | |
|---|---|---|---|---|
| JP | A-2004-101415 | 4/2004 | | |
| JP | A-2006-515938 | 6/2006 | | |
| JP | A-2006-226736 | 8/2006 | | |
| JP | 2010054474 A | 3/2010 | | |
| JP | B2-4652558 | 3/2011 | | |
| JP | WO 2011129060 A1 * | 10/2011 | ............... | G02C 7/04 |
| JP | 2011221446 A * | 11/2011 | ............... | G02C 7/04 |
| JP | A-2011-221446 | 11/2011 | | |

OTHER PUBLICATIONS

Sep. 28, 2015 extended European Search Report issued in Patent Application No. 12876392.7.

* cited by examiner

FIG.10
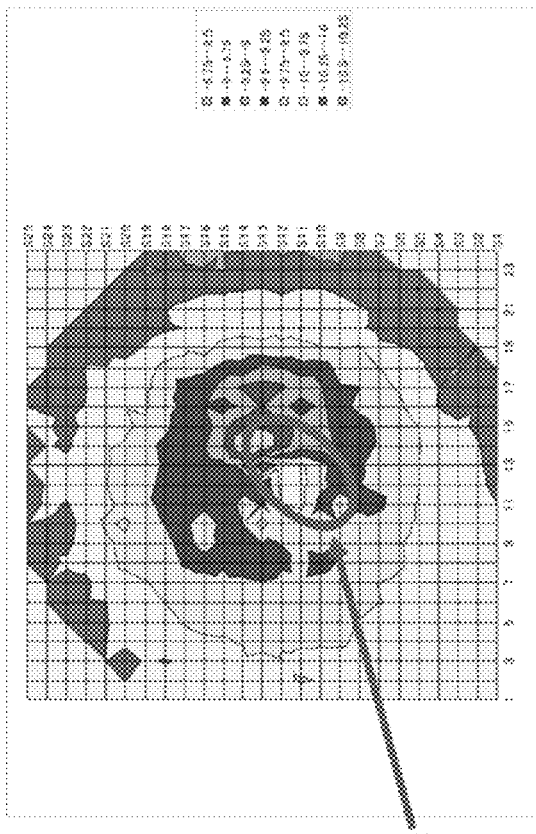
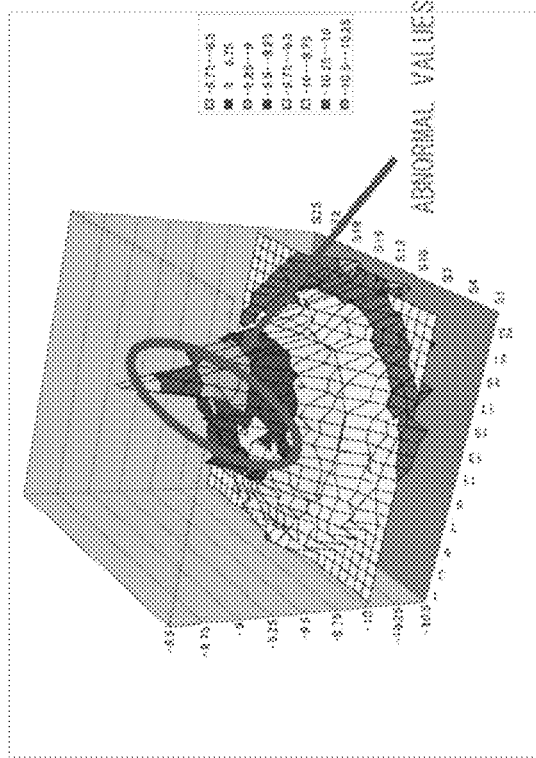

FIG.11

[POWER MAPPING SHOWING SUBSTITUTION BY AVERAGE VALUES]

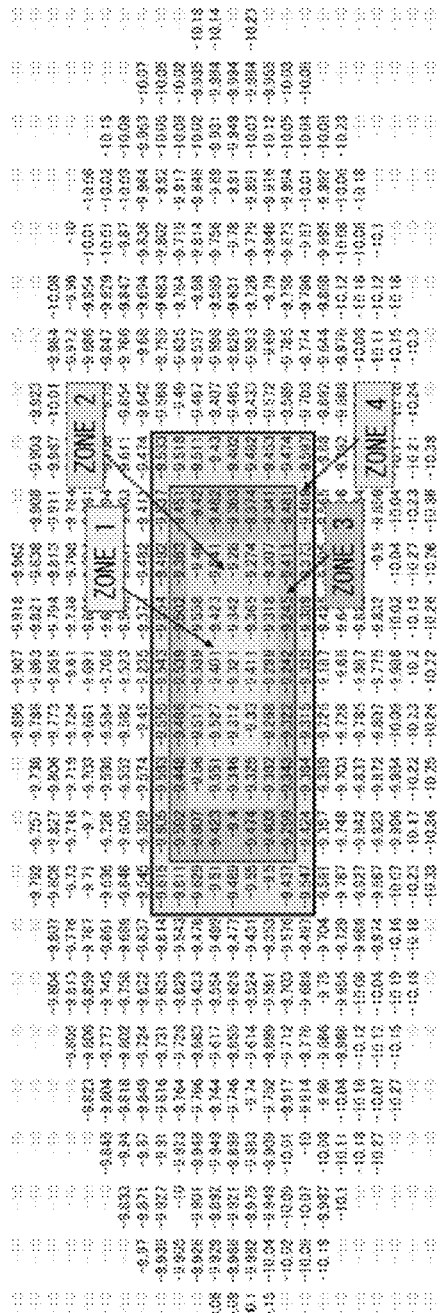
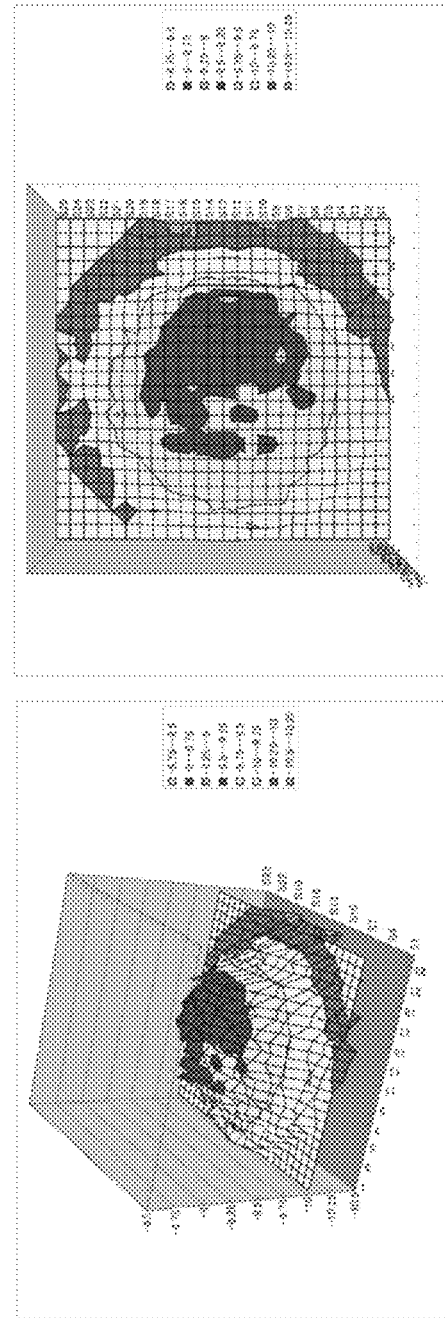
FIG.13 [POWER MAPPING SHOWING FILTERING OF ABNORMAL VALUES (REPEATED UP TO ZONE NUMBER)]

FIG.14

LENS POWER MEASUREMENT DEVICE AND MEASUREMENT METHOD

TECHNICAL FIELD

The present invention relates to a lens power measurement technology for contact lenses, especially to a novel technology capable of measuring power distribution of contact lenses and displaying the measured results by restricting locally abnormal measurement errors while keeping the measurement accuracy.

BACKGROUND ART

For example, measurements of contact lens powers are sometimes required in the product inspection during the manufacturing process of the contact lenses or in the fitting test thereof at the optometrist.

Conventionally, these lens power measurements of contact lenses have been conducted using a lens meter as described in Japanese Unexamined Patent Publication No. JP-A-5-126675 (Patent Document 1) in a state of supporting the contact lens with a proper jig.

However, the lens meter described in Patent Document 1 is the one that measures local lens powers based on the Hartmann method using four beams, which is only able to measure a single lens power at a time. For that reason, it is hard to obtain measurement results in a mapping display of lens powers that indicates where and how the lens powers are added to the optical part of the contact lens and so forth. Therefore, such lens meter is not suitable for measuring the power of contact lenses with different lens powers set in different regions such as the bifocal contact lens.

In recent years, some power measurement devices compatible with underwater use having a mapping display of lens powers are offered, for example under the product names of VC2001 and CONTEST by Visionix Limited and Rotlex Limited, respectively. However, the conventional underwater power measurement devices are made for measuring the lens power at each local measurement site and calculates the lens power from the focal distance determined for such site on the measuring optical axis. Therefore, in a glass lens that significantly varies the intersecting location of visual axes on the lens surface following the eyeball movements, the focal distance for each measurement site might have a certain significance, but it would be a different story for the contact lens fitted on the corneal surface that keeps the intersection of optical axes at nearly a constant location on the lens surface. In other words, it can be considered that the results of measurements by the conventional lens power measurement device for underwater use do not represent the power distribution of the contact lens with practically sufficient accuracy.

BACKGROUND ART DOCUMENTS

Patent Documents

Patent Document 1: JP-A-5-126675

SUMMARY OF THE INVENTION

Problem the Invention Attempts to Solve

Here, the present invention is made against the background described above, and the problem to be solved is to provide a novel lens power measurement device and a novel lens power measurement method that can provide the lens power measurement results in a practical and easy-to-use form by means of displaying the measurement results of the contact lens power in an easy-to-read manner, while maintaining full accuracy thereof.

The present invention is also intended to offer practical and reliable contact lenses with each lens power displayed thereon by using the measurement results obtained by the novel lens power measurement method described above.

Means for Solving the Problem

The present invention provides a lens power measurement device that measures a power distribution of a contact lens comprising: a power distribution calculating member that determines power distribution information of the contact lens based on optical property measurement information of the contact lens; a correction target selecting member that selects correction target information including positive and negative abnormal peaks on both sides of a lens central axis in a lens central area from among the power distribution information obtained by the power distribution calculating member; and a smoothing member that determines a corrected lens power by substituting the correction target information selected by the correction target selecting member with a correction function that smoothes out a region across the both sides of the lens central axis.

Meanwhile, in the lens power measurement device relating to the present invention, a configuration, for example, is favorably adopted, wherein the power distribution calculating member determines the power distribution information of the contact lens as a plurality of multi-order polynomials, the correction target selecting member selects from among the multi-order polynomials a multi-order polynomial containing a hyperbolic function area associated with the positive and negative abnormal peaks on the both sides of the lens central axis as the correction target information, and the smoothing member substitutes the multi-order polynomial selected by the correction target selecting member with the correction function that contains the hyperbolic function area and smoothes out a given region across the both sides of the lens central axis.

In that case, as the multi-order polynomials obtained by the power distribution calculating member described above, multi-order rational functions determined from Zernike polynomials, for example, are adopted more favorably.

The present invention also provides a lens power measurement method comprising: determining power distribution information that indicates a power distribution of a contact lens based on optical property measurement information of the contact lens; selecting correction target information including positive and negative abnormal peaks on both sides of a lens central axis in a lens central area from among the power distribution information; and then determining a corrected lens power by substituting the selected correction target information with a correction function that smoothes out a region across the both sides of the lens central axis.

By the way, in the lens power measurement method relating to the present invention, one aspect, for example, is favorably adopted wherein the corrected lens power is determined by determining a plurality of multi-order polynomials based on the optical property measurement information of the contact lens as the power distribution information that indicates the power distribution of the contact lens, selecting a multi-order polynomial containing a hyperbolic function area associated with the positive and negative abnormal peaks on the both sides of the lens central axis as the correction target information from among the multi-order polynomials, and substituting the selected multi-order polynomial with the correction function that contains the hyperbolic function area and smoothes out a given region across the both sides of the lens central axis.

In that case, as the multi-order polynomials that are determined based on the optical property measurement information of the contact lens and that indicate the power distribution of the contact lens, multi-order rational functions determined from Zernike polynomials, for example, are adopted more favorably.

The present invention further provides a contact lens characterized in that a measurement obtained by the lens power measurement method relating to the present invention described above is displayed thereon as a lens power provided as an optical property.

Effect of the Invention

According to the method of present invention, by focusing on the nature of the measurement errors inherent to contact lenses and by applying specific corrections to the correction target information including the positive and negative abnormal peaks on both sides of the lens central axis, it is now possible to effectively correct the measurement errors while minimizing adverse effects on the overall measurement accuracy to obtain the power distribution information of the contact lens. Also, in the contact lens relating to the present invention that displays lens powers that have been checked against the lens power measurement results obtained in accordance with the present invention, it becomes feasible to capture more reliable values of lens power based on such display.

BRIEF DESCRIPTION OF THE DRAWINGS

FIG. 10 is a graph showing results of mapping the lens power distribution of FIG. 9 in a three-dimensional view (left) and a two dimensional view (right).

FIG. 11 is a view suitable for explaining an example of substitution of abnormal values in the lens power distribution of FIG. 9 with an average value.

FIG. 13 is a power distribution that shows an example of results of Comparative Example where abnormal values in the lens power distribution of FIG. 11 are corrected by the reverse Gaussian filter (top), and graphs showing the results by mapping them in a three-dimensional view (bottom, left) and a two dimensional view (bottom, right).

FIG. 14 is a power distribution that shows an example of results of another Comparative Example where the reverse Gaussian filter is further applied to the lens power distribution of FIG. 13 (top), and graphs showing the results by mapping them in a three dimensional view (bottom, left) and a two dimensional view (bottom, right).

EMBODIMENTS FOR CARRYING OUT THE INVENTION

Embodiments of the present invention will be described below to further clarify the details thereof.

Figure 1:
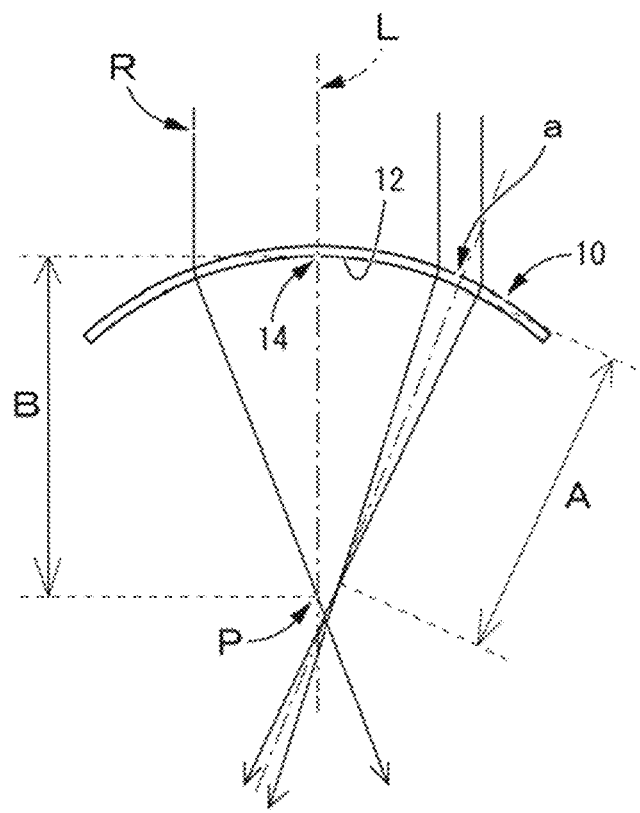
FIG. 1 is a view suitable for explaining a lens power measured in accordance with the method of the present invention.

First, regarding a lens power suitable for a contact lens that does not significantly vary the intersection of visual axes on the lens surface following the eyeball movements, the inventor of the present invention considered that the intersection between the geometric central axis, which is the central axis of the contact lens, and the light ray should be determined as a focal point of the contact lens. In other words, assuming that the intersection between light ray R incident to each part of the contact lens 10 and the lens central axis L is the focal point P, the lens power corresponding to a distance B between the focal point P and a vertex 14 on a spherical concave inner face 12 of the contact lens 10 should preferably be adopted as one of the optical properties of the contact lens 10, as shown in FIG. 1, not the lens power corresponding to the focal distance A as a spherical radius at each light-transmitting portion 'a' measured by the conventional underwater power measurement device as lens power. More specifically, an inverse of distance B (1/B) between the focal point P and the vertex 14 on the concave inner face 12 of the contact lens 10 is considered to be the radius. Here, the vertex 14 means an intersection between the concave inner face 12 of the contact lens 10 and the lens central axis L.

Meanwhile, measurement of the focal distance A of the contact lens 10 can be performed, for example using various wave-front aberration measurement devices and the like that have been publicly known and commercially available. Citing a few examples, a PDI (Point Diffraction Interferometer), a Wyman-Green interferometer, a sharing interferometer and a Talbot wave-front sensor are all adoptable, but especially a Shack-Hartmann wave-front aberration measurement device is favorably adopted due to its simple optical structure with no wavelength limit.

According to the publicly known measurement using the Shack-Hartmann method, the wave-front aberration as an optical property of the lens can be determined from the luminous point mapping formed by a plurality of beam separation elements that penetrate through a single unit of the contact lens 10 at multiple points. That is, the wave-front aberration of an optical system can be determined by ray tracing the wave-front aberrations $W_i(x_i, y_i)$, $(i=1, 2, \ldots n)$, assuming that the wave-front aberration of the optical system is $W(x, y)$ when the coordinate point where the light passes through the contact lens 10 is (x, y). This is because the wave-front aberration indicates a degree of shift (in direction and quantity) of the equiphase wave front formed by plotting the equiphase points of light emitting from the source caused by an optical system (e.g. the contact lens 10) arranged on the transmission path of the light, and therefore, the wave-front aberration measurement information can be obtained by means of capturing the wave-front aberration based on a plane formed by plotting wave fronts perpendicular to each light beam using the ray tracing.

Meanwhile, the method and device by which the wave-front aberration measurement information is determined as optical properties of the optical system (e.g. eyes or the contact lens 10 under measurement) from the measurement results obtained based on the ray tracing method described above are described, for example, in Japanese Patent No. JP-B-4652558. Also, the Shack-Hartmann wave-front aberration measurement device is commercially available as OPAL300 (product name) by Spot Optics.

Figure 2:
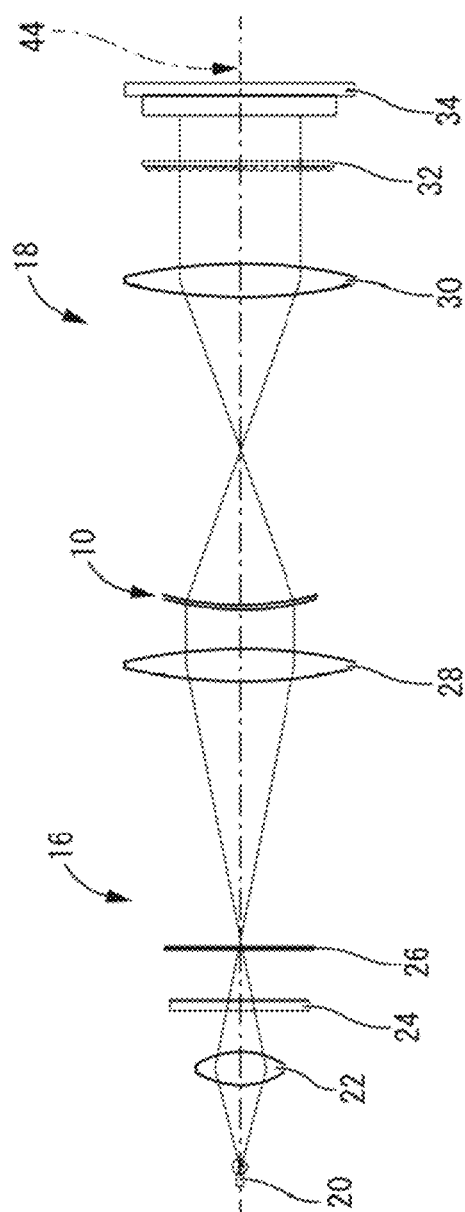
FIG. 2 is a view suitable for explaining a basic structure of a Shack-Hartmann wave-front aberration measurement device.

The present invention relates to a lens power measurement device that measures a contact lens's lens power, which is described by adopting the Shack-Hartmann method as described above. FIG. 2 schematically shows a basic structure of the wave-front aberration measurement device as the publicly known Shack-Hartmann lens power measurement device. Such wave-front aberration measurement device comprises a luminous optical system 16 that illuminates light for measurement and a detective optical system 18 that receives light passing through the contact lens 10. The luminous optical system 16 is made to project light for measurement emitted by a lighting source 20 from a collimator lens 28 arranged on the side of the luminous optical system 16 to the contact lens 10 on the optical axis via a condenser lens 22, a filter 24 and a pinhole plate 26. The light for measurement transmitted through the contact lens 10 is guided from a collimator lens 30 arranged on the side of the detective optical system 18 to a micro-lens array (MLA) 32 in the detective optical system 18, and the luminous flux passed through the micro-lens is detected by an image sensor CCD 34. The wave-front aberration measurement device is also provided with an arithmetic operation unit that determines the wave-front aberration based on the information on the detected location of the luminous flux and the like in addition to the optical system shown in FIG. 2, and the optical properties such as wave-front aberration obtained by the arithmetic operation unit are outputted to a monitor and the like.

However, since the wave-front aberration measurement device described above is disclosed in the specification of U.S. Pat. No. 7,078,665 and so forth other than JP-B-4652558, detailed explanation of the general structure will be omitted herein.

Based on the wave-front aberration measurement information obtained by the wave-front aberration measurement device described above, it is possible to obtain functions comprising a plurality of multi-order polynomials that additively represent optical properties of the contact lens 10 which is the optical system under measurement. In other words, all of these functions are expressed by characteristically resolving the wave-front aberration exerted by the contact lens 10 on the light for measurement, and because the light rays intersect perpendicular to the wave front, it is possible to determine the lens power distribution at each part of the contact lens 10 from such wave-front aberration measurement information.

More specifically, as the plurality of functions described above, the publicly known Zernike polynomials are favorably adopted. That is, in expressing the wave-front aberration $W_i (x_i, y_i)$, (i=1, 2, . . . , n) on the lens surface obtained through the ray tracing method by measuring the contact lens 10 described above as a function of x, y and lens parameters, it is practical to preset the functional form and determine a coefficient from $W_i$ (i=1, 2, . . . , n) using the least squares method. Especially when the optical system is symmetrical, it is desirable to adopt the standard Zernike polynomials or fringe Zernike polynomials in a polar coordinate system as functions for approximating the wave-front aberration.

By the way, obtaining Zernike polynomials that express the optical properties of the optical system under measurement based on the wave-front aberration measurement information obtained from the measured results using the ray tracing method is publicly known as being applied to measurement of optical properties of the optical system under measurement. However, the inventor of the present invention focused on the fact that a special problem arises by applying such technology to the lens power measurement of the contact lens 10 and found an effective solution to the special problem of the contact lens 10.

In other words, the special problem that arises in measuring the lens power of the contact lens 10 is the fact that apparent errors of abnormal peak values of lens power tend to occur near the central axis of the contact lens 10, which is the optical measurement axis.

It is an idea to output measurement results excluding these abnormal peaks by means of applying a smoothing process to them using the publicly known reverse Gaussian filter, for example. However, such smoothing process is a filtering process by a moving average filter whereby the values measured using the reverse Gaussian function at multiple points in the peripheral area including the abnormal peaks are weighed against each other. Therefore, because of the smoothing process on the measured values in the area identified to contain abnormal values using the standard deviation, it is inevitable to affect the measured values in the peripheral area that are not identified as abnormal, which is likely to cause a problem of lowered accuracy in measuring the values other than abnormal ones in the peripheral area due to the smoothing process.

Here, the inventor of the present invention first examined the cause of the abnormal peaks and obtained the knowledge that the main cause of generation thereof is 'decenter and tilt' of the central axis of the contact lens 10 against the optical measurement axis in the measurement of the optical properties. Especially the contact lens 10, which is much smaller and softer than a glass lens, is rather hard to set in place in the measurement device, which is considered likely to cause the decenter and tilt.

Figure 3:
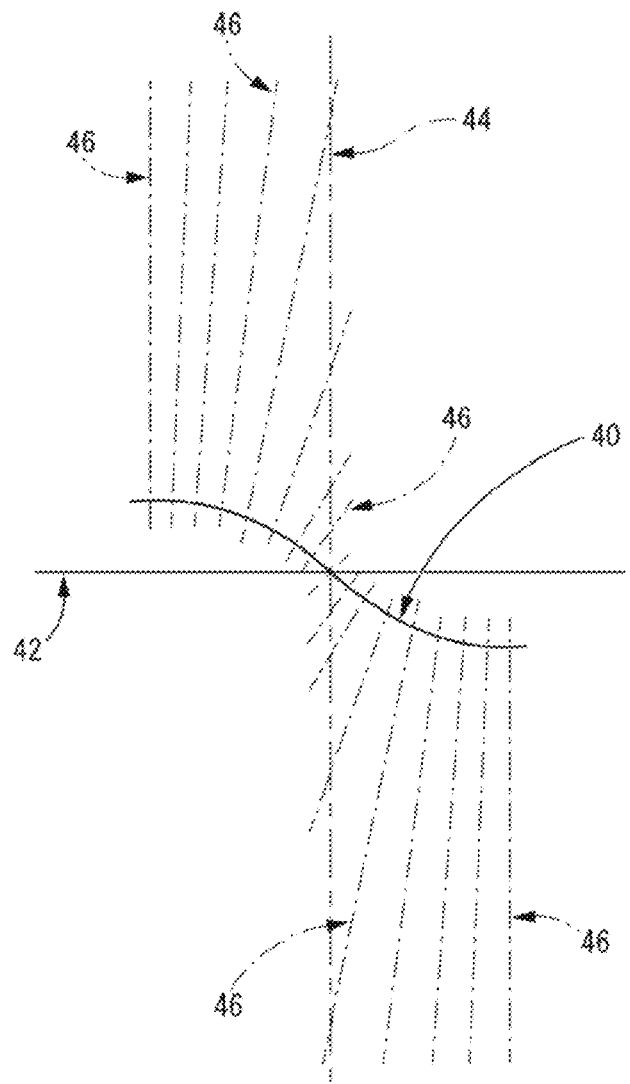
FIG. 3 is a view suitable for explaining a relation between a traveling direction of light relative to a wave front and a focal point.

In addition, after further examination of measurement errors caused by setting failures such as decenter and tilt, the inventor focused on the fact that those errors appear in the measurement results as abnormal peaks with specific characteristics. Then, the inventor obtained the knowledge that the characteristics of those abnormal peaks can be understood as wave-front aberration in a specific form. In other words, when there is any decenter or tilt in the setting of the measurement optical system of the contact lens 10, and focusing only on the wave-front aberration corresponding to the optical properties caused thereby, a wave front 40 of the light transmitting through the contact lens is considered to have opposite phase differences on one side and the other of a standard wave front 42 centered around a measurement optical system central axis 44 as shown in FIG. 3. This makes the direction of each light ray 46, which is the normal direction of the wave front 40, substantially tilted in the area near the measurement optical system central axis 44, and the focal point where the light ray intersects with the measurement optical system central axis 44 generates the local minimum value at a position in proximity thereof. Therefore, it is inferred that the lens power, which is an inverse of the focal distance, ends up having measurement errors that appear as abnormal peaks near the measurement optical system central axis 44 due to the measurement errors presumably caused by such decenter and tilt.

Then, the inventor of the present invention focused on the fact that the abnormal peaks, which are measurement errors in the measured values of the lens power, appear as positive and negative abnormal peaks on both sides of the measurement optical system central axis 44, which is considered to be the lens central axis for measurement. As a result, the inventor obtained the knowledge that, because those abnormal peaks have specific characteristics, the optical properties causing abnormal peaks can be selected and extracted by means of selecting a specific function associated with abnormal peaks among multiple functions that represent wave-front aberration, which is one of the lens characteristics.

Especially since the abnormal peaks can be understood as a result of generation of wave-front aberration as described above, in obtaining measured results of optical properties using the Zernike polynomials described above that can be expressed by coefficients corresponding to the characteristics of the wave-front aberration for example, it becomes possible to identify and extract those functions associated with abnormal peaks in a more efficient way.

Further, it is now possible to correct measurement errors generated due to the setting failures in the measurement device of the contact lens 10 such as the decenter and tilt described above, by means of selecting functions associated with the abnormal peaks among the measured results of lens powers and correcting multi-order polynomials composed of those functions and even rational functions expressing the lens power distribution obtained therefrom. Then, by means of selectively correcting the information relating to the abnormal peaks caused by the measurement errors as described above, it is now possible to implement effective corrections to the measurement errors while avoiding any impact on other optical properties as much as possible.

Here, since the abnormal peaks deriving from the measurement errors of the contact lens 10 are considered to be caused by the positive and negative phase differences on both sides of the measurement optical system central axis 44, which is considered the lens central axis for measurement as described above, it seems to be effective to focus only on the coma components, for example, as functions to be corrected in order to identify and extract those errors.

Meanwhile, the coma components, which are optical properties obtained from measurement results, include inherent optical properties of the contact lens 10, but not all coma components are measurement errors. Especially, measurement of optical properties of the contact lens 10 is performed only after the positioning of the lens central axis relative to the measurement optical system central axis 44, and the measurement errors caused by coma components on the wave front take a local maximum value near the measurement optical system central axis 44. Therefore, the coma components in the peripheral area are not based on the measurement errors but are dominantly those of inherent optical properties of the lens, which makes it appropriate to consider that the measurement information to be corrected are generated only in the central portion of the contact lens 10.

Therefore, once optical properties are obtained as multi-order polynomials such as the Zernike polynomials described above and functions relating to measurement errors are identified and extracted therefrom, measurement error components inherent in the lens power distribution determined based on such functions are corrected. In such correction process, since the lens power error components are considered to have peak characteristics reversed in positivity and negativity on both sides of the measurement optical system central axis 44, it is now considered possible, by removing only those peak values, to correct the information more efficiently, that is, to perform more effective corrections while avoiding adverse effects on the measurement results of the original optical properties as much as possible.

Correction procedures based on such technological knowledge will be specifically exemplified below. The wave-front measurements in the specific example below are conducted using OPAL300 (product name) by Spot Optics. The basic structure of wave-front measurement in such device is the same as that of the Shack-Hartmann wave-front aberration measurement device shown in FIG. 2.

Figure 4:
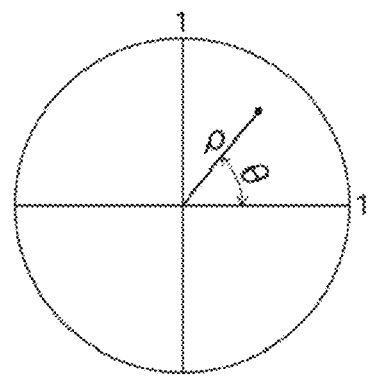
FIG. 4 is view suitable for explaining a polar coordinate plane for defining $\rho$ and $\theta$ used in Zernike polynomials.

That is, in such wave-front aberration measurement device, the wave-front aberration, which is one of optical properties of the contact lens 10, can be represented by the Zernike polynomials shown in Equation 1 expressed using the values ρ and θ that define the normalized radius in the polar coordinate system as shown in FIG. 4.

$$W(\rho, \theta) = \sum_{n=0}^{k} \sum_{i=0}^{n} C_{\frac{n(n+2)+m}{2}} R_n^{|m|} \left\{ \begin{array}{c} \cos(m\theta) \\ \sin(-m\theta) \end{array} \right\}$$ [Equation 1]

$m$: Frequency; $n$: Number of order;

$k$: Maximum number of terms $C_{\frac{n(n+2)+m}{2}}$:

$\frac{n(n+2)+m}{2}$ $\frac{n(n+2)+m}{2}$ th coefficient $R_n^{|m|} =$ $$\sum_{s=0}^{(n-|m|)/2} \frac{(-1)^s (n-s)!}{s![0.5(n+|m|)-s]![0.5(n-|m|)-s]!} \rho^{n-2s}$$

Table 1 shows expanded equations of the Zernike polynomial expressed by Equation 1 up to the fourteenth order.

TABLE 1

[Expanded equations from the Zernike polynomials in the rotating system]

| n | m | Item | RMS form | |
|---|---|------|----------|---|
| 0 | 0 | Piston | 1 | 1 |
| 1 | 1 | Tilt | $\sqrt{4}$ | $\rho \cos(\theta + \theta_{1,1})$ |
| 2 | 0 | Defocus | $\sqrt{3}$ | $2\rho^1 - 1$ |
| 2 | 2 | Astigmatism | $\sqrt{6}$ | $\rho^2 \cos(2(\theta + \theta_{2,2}))$ |
| 3 | 1 | Coma | $\sqrt{8}$ | $(3\rho^3 - 2\rho)\cos(\theta + \theta_{3,1})$ |
| 3 | 3 | Trefoil | $\sqrt{8}$ | $\rho^3 \cos(3(\theta + \theta_{3,3}))$ |
| 4 | 0 | SA | $\sqrt{5}$ | $6\rho^4 - 6\rho^2 + 1$ |
| 4 | 2 | 2nd Astigmatism | $\sqrt{10}$ | $(4\rho^4 - 3\rho^2)\cos(2(\theta + \theta_{4,2}))$ |
| 4 | 4 | Quatrefoil | $\sqrt{10}$ | $\rho^4 \cos(4(\theta + \theta_{4,4}))$ |
| 5 | 1 | 2nd Coma | $\sqrt{12}$ | $(10\rho^5 - 12\rho^3 + 3\rho)\cos(\theta + \theta_{5,1})$ |
| 5 | 3 | 2nd Trefoil | $\sqrt{12}$ | $(5\rho^5 - 4\rho^3)\cos(3(\theta + \theta_{5,3}))$ |
| 5 | 5 | 5foil | $\sqrt{12}$ | $\rho^5 \cos(5(\theta + \theta_{5,5}))$ |
| 6 | 0 | 2nd SA | $\sqrt{7}$ | $20\rho^6 - 30\rho^4 + 12\rho^2 - 1$ |
| 6 | 2 | 3rd Astigmatism | $\sqrt{14}$ | $(15\rho^6 - 20\rho^4 + 6\rho^2)\cos(2(\theta + \theta_{6,2}))$ |

TABLE 1-continued

[Expanded equations from the Zernike polynomials in the rotating system]

| n | m | Item | RMS | form |
|---|---|------|-----|------|
| 6 | 4 | 2nd Quatrefoil | $\sqrt{14}$ | $(6\rho^6 - 5\rho^4)\cos(4(\theta + \theta_{6,4}))$ |
| 6 | 6 | 6foil | $\sqrt{14}$ | $\rho^6\cos(6(\theta + \theta_{6,6}))$ |
| 7 | 1 | 3rd Coma | $\sqrt{16}$ | $(35\rho^7 - 60\rho^5 + 30\rho^3 - 4\rho)\cos(\theta + \theta_{7,1})$ |
| 7 | 3 | 3rd Trefoil | $\sqrt{16}$ | $(21\rho^7 - 30\rho^5 + 10\rho^3)\cos(3(\theta + \theta_{7,3}))$ |
| 7 | 7 | 7foil | $\sqrt{16}$ | $\rho^7\cos(7(\theta + \theta_{7,7}))$ |
| 8 | 0 | 3rd SA | $\sqrt{9}$ | $70\rho^8 - 140\rho^6 + 90\rho^4 - 20\rho^2 + 1$ |
| 8 | 2 | 4th Astigmatism | $\sqrt{18}$ | $(56\rho^8 - 105\rho^6 + 60\rho^4 - 10\rho^2)\cos(2(\theta + \theta_{8,2}))$ |
| 8 | 4 | 3rd Quatrefoil | $\sqrt{18}$ | $(28\rho^8 - 42\rho^6 + 15\rho^4)\cos(4(\theta + \theta_{8,4}))$ |
| 8 | 8 | 8foil | $\sqrt{18}$ | $\rho^8\cos(8(\theta + \theta_{8,8}))$ |
| 9 | 1 | 4th Coma | $\sqrt{20}$ | $(126\rho^9 - 280\rho^7 + 210\rho^5 - 60\rho^3 + 5\rho)\cos(\theta + \theta_{9,1})$ |
| 9 | 3 | 4th Trefoil | $\sqrt{20}$ | $(84\rho^9 - 168\rho^7 + 105\rho^5 - 20\rho^3)\cos(3(\theta + \theta_{9,3}))$ |
| 10 | 0 | 4th SA | $\sqrt{11}$ | $252\rho^{10} - 630\rho^8 + 560\rho^6 - 210\rho^4 + 30\rho^2 - 1$ |
| 10 | 2 | 5th Astigmatism | $\sqrt{22}$ | $(210\rho^{10} - 504\rho^8 + 420\rho^6 - 140\rho^4 + 15\rho^2)\cos(2(\theta + \theta_{10,2}))$ |
| 10 | 4 | 4th Quatrefoil | $\sqrt{22}$ | $(120\rho^{10} - 252\rho^8 + 168\rho^6 - 35\rho^4)\cos(4(\theta + \theta_{10,4}))$ |
| 11 | 1 | 5th Coma | $\sqrt{24}$ | $(462\rho^{11} - 1260\rho^9 + 1260\rho^7 - 560\rho^5 + 105\rho^3 - 6\rho)\cos(2(\theta + \theta_{11,1}))$ |
| 11 | 3 | 5th Trefoil | $\sqrt{24}$ | $(330\rho^{11} - 840\rho^9 + 756\rho^7 - 280\rho^5 + 35\rho^3)\cos(3(\theta + \theta_{11,3}))$ |
| 12 | 0 | 5th SA | $\sqrt{13}$ | $924\rho^{12} - 2772\rho^{10} + 3150\rho^8 - 1680\rho^6 + 420\rho^4 - 42\rho^2 + 1$ |
| 12 | 2 | 6th Astigmatism | $\sqrt{26}$ | $(792\rho^{12} - 2310\rho^{10} + 2520\rho^8 - 1260\rho^6 + 280\rho^4 - 21\rho^2)\cos(2(\theta + \theta_{12,2}))$ |
| 12 | 4 | 5th Quatrefoil | $\sqrt{26}$ | $(495\rho^{12} - 1320\rho^{10} + 1260\rho^8 - 504\rho^6 + 70\rho^4)\cos(4(\theta + \theta_{12,4}))$ |
| 13 | 1 | 6th Coma | $\sqrt{28}$ | $(1716\rho^{13} - 5444\rho^{11} + 6930\rho^9 - 4200\rho^7 + 1260\rho^5 - 168\rho^3 + 7\rho)\cos(2(\theta + \theta_{13,1}))$ |
| 13 | 3 | 6th Trefoil | $\sqrt{28}$ | $(1287\rho^{13} - 3960\rho^{11} + 4620\rho^9 - 2520\rho^7 + 630\rho^5 - 56\rho^3)\cos(3(\theta + \theta_{13,3}))$ |
| 14 | 0 | 6th SA | $\sqrt{15}$ | $(3432\rho^{14} - 12012\rho^{12} + 16632\rho^{10} - 11550\rho^8 + 4200\rho^6 - 756\rho^4 + 56\rho^2 - 1$ |
| 14 | 2 | 7th Astigmatism | $\sqrt{30}$ | $(3003\rho^{14} - 10296\rho^{12} + 13860\rho^{10} - 9240\rho^8 + 3150\rho^6 - 504\rho^4 + 28\rho^2)\cos(2(\theta + \theta_{14,2}))$ |

For example, with regard to the measurement luminous flux, the wave-front aberration measurement device is capable of obtaining data on the amount and direction of eccentricity determined by detecting the amount and direction of eccentricity of the detected position of the light transmitting through the contact lens 10 relative to the reference point, which is the position where the light is detected without the contact lens 10, and wave-front aberration of the contact lens 10 can be determined by rebuilding the wave front of the transmitted light from those data of detected images (amount and direction of eccentricity of the measurement luminous flux). Then, based on the obtained measurement results of wave-front aberration, the lens power, which is an inverse of the focal distance of the contact lens on the central axis that turns out to be the measurement optical system central axis 44, can be determined by the publicly known means that uses, for example, the light tracing method to trace the light rays perpendicular to the wave front.

If the contact lens is soaked in a liquid for measurement, the lens power should be converted according to Equation 2 below. In that equation, $n_{Lens}$ and $n_{Medium}$ are material refractive index of the contact lens 10 and the refractive index of the liquid in which the contact lens 10 is soaked, respectively, and the latter value turns out to be $n_{medium}=1$ when measured in the air. Also, when nonparallel light is used as the measurement luminous flux, the measured powers need to be considered as the base power.

[Conversion of power (Wet.Power → Dry.Power)]   [Equation 2]

Calculation of F.C.

$$F.C. = \frac{(n_{Lens} - n_{Medium})n_{Lens}(B.C./1000) + (B.C./1000)}{\dfrac{(n_{Lens} - n_{Medium})^2}{Power\_w \cdot (B.C./1000)n_{Lens} + (n_{Lens} - n_{Medium})n_{Lens}}}$$

Calculation of Dry.Power $$\text{Dry.Power} = \frac{n_{Lens}(n_{Lens} - 1)}{n_{Lens} \cdot F.C. - (n_{Lens} - 1)(C.T./1000)} - \frac{n_{Lens} - 1}{(B.C./1000)}$$

For simplified calculation: B.C.=∞, C.T.=0

If no need for conversion (measurement in the air, IOL measurement etc.): $n_{Medium}=1$ Thus, the focal point can be identified where the parallel measurement light incident to the contact lens 10 is transmitted therethrough and intersects with the measurement optical system central axis 44 based on the measured information of wave-front aberration using the Shack-Hartmann method, and the lens power of the contact lens 10 defined as an inverse of the distance between such focal point and the vertex 14 on the concave inner face 12 of the contact lens 10.

Using the Shack-Hartmann wave-front aberration measurement device, it is possible to set a plurality of zones surrounded by no less than three (more preferably four or five) light detection positions, and the lens power in each zone can be obtained as zonal measurement information based on the information on the eccentricity of the detected light measured in each zone. Thus, the method of present invention can be applied to the measurement information of lens power independently obtained per each zone, that is, the zonal measurement information as the power distribution information of the contact lens.

However, in the present embodiment, the wave front is rebuilt based on each detected value regarding the amount and direction of eccentricity of the transmitted light, as described above, which is the optical property measurement information of the contact lens 10, and the Zernike polynomials expressing the wave-front aberration, which are the optical property information of the contact lens 10, are obtained by calculation. Then, the power distribution information of the contact lens 10 is obtained from those Zernike polynomials. Now, in the present embodiment, a case will be described below where the method of present invention is applied to the power distribution information of the contact lens 10, as the modal measurement information identified by the Zernike polynomials as multi-order polynomials.

However, in the Shack-Hartmann wave-front aberration measurement information adopting the standard Zernike polynomials, the coefficient of each term of the obtained Zernike polynomial is a root mean square (RMS) value, which is expressed as so-called 'effective aberration value.' Therefore, it needs to be converted to the real aberration value by multiplying the RMS coefficient corresponding to each term according to Equation 3 shown below. In that equation, since the positive and negative values of the wave-front aberration are defined by attaching a positive sign when the timing lags behind the standard wave front and a negative sign when it advances ahead thereof, '−1' is multiplied to the right term for generalization. If the coefficient of the outputted Zernike polynomial (angle $\theta_{m,n}$) is in the range of 0° to 360°, the negative sign is unnecessary, but when it is in the range of −180° to 180°, '−1' should be multiplied and the outputted value should be converted to a system of 0° to 360°.

$$C_{Ri} = -C_i \cdot RMS_i, \quad \text{[Equation 3]}$$

$C_{Ri}$: Coefficient of $i^{th}$ real wave-front aberration term.
Ci: Coefficient of $i^{th}$ wave-front aberration term.
$RMS_i$: $i^{th}$ RMS coefficient (in mm)

Also, the vector radius ρ in the Zernike polynomial can be expressed by Equation 4 below in a polar coordinate system when converted to the real unit.

$$\rho = r/r_{max} \quad \text{[Equation 4]}$$

Then, the inclination on the wave front (direction of the ray light) can be obtained by differentiating the Zernike polynomial that represents the wave front, which is expressed by tan π assuming the ray light angle relative to the optical axis is π. Since the amount of wave-front aberration is smaller enough than the focal distance d, it can be interpreted as tan π=r/d. Therefore, the power of the contact lens 10 can be expressed by Equation 5 below.

$$W(\rho,\theta) = \sum_{i=0}^{\infty} C_{Ri} Z_i(\rho,\theta) = \sum_{i=0}^{\infty} C_{Ri} Z_i(r,\theta)$$

$$\frac{dW}{dr} = \sum_{i=0}^{\infty} C_{Ri} \frac{dZ_i}{dr}$$

$$V = \frac{1}{d} = \frac{\tan\tau}{r} = \frac{dW/dr}{r}$$

$$\therefore V = \sum_{i=0}^{\infty} C_{Ri} \frac{dZ_i(r,\theta)}{dr} \Big/ r_{*1}$$

[Equation 5]

Power_w=1000·V (converted to meter)
*1: Regarding $$\frac{dZ_i(r,0)}{dr}/r,$$

see the 'form' column in Table 2.

TABLE 2

[Expanded equations of lens power from the Zernike polynomials]

| n | m | Item | RMS | form |
|---|---|------|-----|------|
| 0 | 0 | Piston | 1 | 0 |
| 1 | 1 | Tilt | $\sqrt{4}$ | $1/(r \cdot r_{max})\cos(\theta + \theta_{1,1})$ |
| 2 | 0 | Defocus | $\sqrt{3}$ | $4/r_{max}^2$ |
| 2 | 2 | Astigmatism | $\sqrt{6}$ | $2/r_{max}^2 \cos(2(\theta + \theta_{2,2}))$ |
| 3 | 1 | Coma | $\sqrt{8}$ | $(9r/r_{max}^3 - 2/(r \cdot r_{max}))\cos(2(\theta + \theta_{3,1}))$ |
| 3 | 3 | Trefoil | $\sqrt{8}$ | $3r/r_{max}^3 \cos(3(\theta + \theta_{3,3}))$ |
| 4 | 0 | SA | $\sqrt{5}$ | $24r^2/r_{max}^4 - 12/r_{max}^2$ |
| 4 | 2 | 2nd Astigmatism | $\sqrt{10}$ | $(16r^2/r_{max}^4 - 6/r_{max}^2)\cos(2(\theta + \theta_{4,2}))$ |
| 4 | 4 | Quatrefoil | $\sqrt{10}$ | $4r^2/r_{max}^4 \cos(4(\theta + \theta_{4,4}))$ |
| 5 | 1 | 2nd Coma | $\sqrt{12}$ | $(50r^3/r_{max}^5 - 36r/r_{max}^3 + 3/(r \cdot r_{max}))\cos(\theta + \theta_{5,1}))$ |
| 5 | 3 | 2nd Trefoil | $\sqrt{12}$ | $(25r^3/r_{max}^5 - 12r/r_{max}^3)\cos(3(\theta + \theta_{5,3}))$ |
| 5 | 5 | 5foil | $\sqrt{12}$ | $5r^3/r_{max}^5 \cos(5(\theta + \theta_{5,5}))$ |

TABLE 2-continued

[Expanded equations of lens power from the Zernike polynomials]

| n | m | Item | RMS | form |
|---|---|------|-----|------|
| 6 | 0 | 2nd SA | $\sqrt{7}$ | $120r^4/r_{max}^6 - 120r^2/r_{max}^4 + 24/r_{max}^2$ |
| 6 | 2 | 3rd Astigmatism | $\sqrt{14}$ | $(90r^4/r_{max}^6 - 80r^2/r_{max}^4 + 12/r_{max}^2)\cos(2(\theta + \theta_{6,2}))$ |
| 6 | 4 | 2nd Quatrefoil | $\sqrt{14}$ | $(36r^4/r_{max}^6 - 20r^2/r_{max}^4)\cos(4(\theta + \theta_{6,4}))$ |
| 6 | 6 | 6foil | $\sqrt{14}$ | $6r^4/r_{max}^6 \cos(6(\theta + \theta_{6,6}))$ |
| 7 | 1 | 3rd Coma | $\sqrt{16}$ | $(245r^5/r_{max}^7 - 300r^3/r_{max}^5 + 90r/r_{max}^3 - 4/(r \cdot r_{max}))\cos(2(\theta + \theta_{7,1}))$ |
| 7 | 3 | 3rd Trefoil | $\sqrt{16}$ | $(147r^5/r_{max}^7 - 150r^3/r_{max}^5 + 30r/r_{max}^3)\cos(3(\theta + \theta_{7,3}))$ |
| 7 | 7 | 7foil | $\sqrt{16}$ | $7*r^5/r_{max}^7 \cos(7(\theta + \theta_{7,7}))$ |
| 8 | 0 | 3rd SA | $\sqrt{9}$ | $560r^6/r_{max}^8 - 840r^4/r_{max}^6 + 360r^2/r_{max}^4 - 40/r_{max}^2$ |
| 8 | 2 | 4th Astigmatism | $\sqrt{18}$ | $(448r^6/r_{max}^8 - 630r^4/r_{max}^6 + 240r^2/r_{max}^4 - 20/r_{max}^2)\cos(2(\theta + \theta_{8,2}))$ |
| 8 | 4 | 3rd Quatrefoil | $\sqrt{18}$ | $(224r^6/r_{max}^8 - 252r^4/r_{max}^6 + 60r^2/r_{max}^4)\cos(4(\theta + \theta_{8,4}))$ |
| 8 | 8 | 8foil | $\sqrt{18}$ | $8r^6/r_{max}^8 \cos(8(\theta + \theta_{8,8}))$ |
| 9 | 1 | 4th Coma | $\sqrt{20}$ | $(1134r^7/r_{max}^9 - 1960r^5/r_{max}^7 + 1050r^3/r_{max}^5 - 180r/r_{max}^3 + 5/(r \cdot r_{max}))\cos(\theta + \theta_{9,1})$ |
| 9 | 3 | 4th Trefoil | $\sqrt{20}$ | $(756r^7/r_{max}^9 - 1176r^5/r_{max}^7 + 525r^3/r_{max}^5 - 60r/r_{max}^3)\cos(3(\theta + \theta_{9,3}))$ |
| 10 | 0 | 4th SA | $\sqrt{11}$ | $2520r^8/r_{max}^{10} - 5040r^6/r_{max}^8 - 5040r^4/r_{max}^6 - 840r^2/r_{max}^4 + 60/r_{max}^2$ |
| 10 | 2 | 5th Astigmatism | $\sqrt{22}$ | $(2100r^8/r_{max}^{10} - 4032r^6/r_{max}^8 + 2520r^4/r_{max}^6 - 560r^2/r_{max}^4 + 30/r_{max}^2)\cos(2(\theta + \theta_{10,2}))$ |
| 10 | 4 | 4th Quatrefoil | $\sqrt{22}$ | $(1200r^8/r_{max}^{10} - 2016r^6/r_{max}^8 + 1008r^4/r_{max}^6 - 140r^2/r_{max}^4)\cos(4(\theta + \theta_{10,4}))$ |
| 11 | 1 | 5th Coma | $\sqrt{24}$ | $(5082r^9/r_{max}^{11} - 11340r^7/r_{max}^9 + 8820r^5/r_{max}^7 - 2800r^3/r_{max}^5 + 315r/r_{max}^3 - 6r/(r \cdot r_{max}))\cos(\theta + \theta_{11,1})$ |
| 11 | 3 | 5th Trefoil | $\sqrt{24}$ | $(3630r^9/r_{max}^{11} - 7560r^7/r_{max}^9 + 5292r^5/r_{max}^7 - 1400r^3/r_{max}^5 + 150r/r_{max}^3)\cos(3(\theta + \theta_{11,3}))$ |
| 12 | 0 | 5th SA | $\sqrt{13}$ | $11088r^{10}/r_{max}^{12} - 27720r^8/r_{max}^{10} + 25200r^6/r_{max}^8 - 10080r^4/r_{max}^6 + 1680r^2/r_{max}^4 - 84/r_{max}^2$ |
| 12 | 2 | 6th Astigmatism | $\sqrt{26}$ | $(950r^{10}/r_{max}^{12} - 23100r^8/r_{max}^{10} + 20160r^6/r_{max}^8 - 7560r^4/r_{max}^6 + 1120r^2/r_{max}^4 - 42/r_{max}^2)\cos(2(\theta + \theta_{12,1}))$ |
| 12 | 4 | 5th Quatrefoil | $\sqrt{26}$ | $(5940r^{10}/r_{max}^{12} - 13200r^8/r_{max}^{10} + 10080r^6/r_{max}^8 - 3024r^4/r_{max}^6 + 280r^2/r_{max}^4)\cos(4(\theta + \theta_{12,4}))$ |
| 13 | 1 | 6th Coma | $\sqrt{28}$ | $22380r^{11}/r_{max}^{13} - 60984r^9/r_{max}^{11} + 62730r^7/r_{max}^9 - 29400r^5/r_{max}^7 + 6300r^3/r_{max}^5 - 504r/r_{max}^3 + 7r/(r \cdot r_{max}))\cos(\theta + \theta_{13,1})$ |
| 13 | 3 | 6th Trefoil | $\sqrt{28}$ | $16731r^{11}/r_{max}^{13} - 43560r^9/r_{max}^{11} + 11580r^7/r_{max}^9 - 17640r^5/r_{max}^7 + 3150r^3/r_{max}^5 - 168r/r_{max}^3)\cos(3(\theta + \theta_{13,2}))$ |
| 14 | 0 | 6th SA | $\sqrt{15}$ | $48048r^{12}/r_{max}^{14} - 144144r^{10}/r_{max}^{12} + 166320r^8/r_{max}^{10} - 92400r^6/r_{max}^8 + 25200r^6/r_{max}^6 - 3024r^2/r_{max}^4 + 112r_{max}^2$ |
| 14 | 2 | 7th Astigmatism | $\sqrt{30}$ | $(42042r^{12}/r_{max}^{14} - 123552r^{10}/r_{max}^{12} + 138600r^8/r_{max}^{10} - 73920r^6/r_{max}^8 + 18900r^4/r_{max}^6 - 2016r^2/r_{max}^4 + 56/r_{max}^2)\cos(2(\theta + \theta_{14,2}))$ |

Thus, multi-order rational functions, which are the plurality of multi-order polynomials expressing the power distribution of the contact lens 10, can be obtained based on the Zernike polynomials as wave-front aberration information, which are the optical property measurement information of the contact lens 10. Such acquisition of rational functions is performed by differential calculations of Zernike polynomials and the like, and the wave-front aberration measurement device of the present embodiment has a computer unit that executes arithmetic operation processing with the power distribution calculating member.

In addition, the obtained power distribution information often contain measurement errors described above requiring a smoothing process, that is, a correction process that removes such measurement errors. In other words, the measurement errors at issue are caused by coma components, which are aberration components that are considered to exhibit abnormal peaks at the center of the contact lens 10 caused by being symmetrically reversed in positivity and negativity on both sides of the measurement optical system central axis 44 as wave-front aberrations.

Therefore, the correction process of the measurement errors that exhibit such abnormal peaks is to first select specific multi-order polynomials that represent lens power information caused by functions expressing coma components of the Zernike polynomials corresponding to the aberration components. Here, such specific multi-order polynomials have a hyperbolic function area where the abnormal peaks appear and the errors are reversed in positivity and negativity on both sides of the measurement optical system central axis 44, which is considered as the lens central axis for measurement. Then, in order to smooth out the given region across the both sides of the measurement optical system central axis 44 within the hyperbolic function area, substitution with proper correction functions is performed. This allows the correction process to be carried out to remove the abnormal peaks. Thus, the wave-front aberration measurement device of the present embodiment has a computer that executes the correction target selecting member, while also having a computer that executes the smoothing member whereby a given region in each selected multi-order polynomial is substituted with the correction functions to perform smoothing. The aforementioned computer that executes the power distribution calculating member, correction target selecting member, and smoothing member can all be individual units or combined into a single unit.

Figure 5:
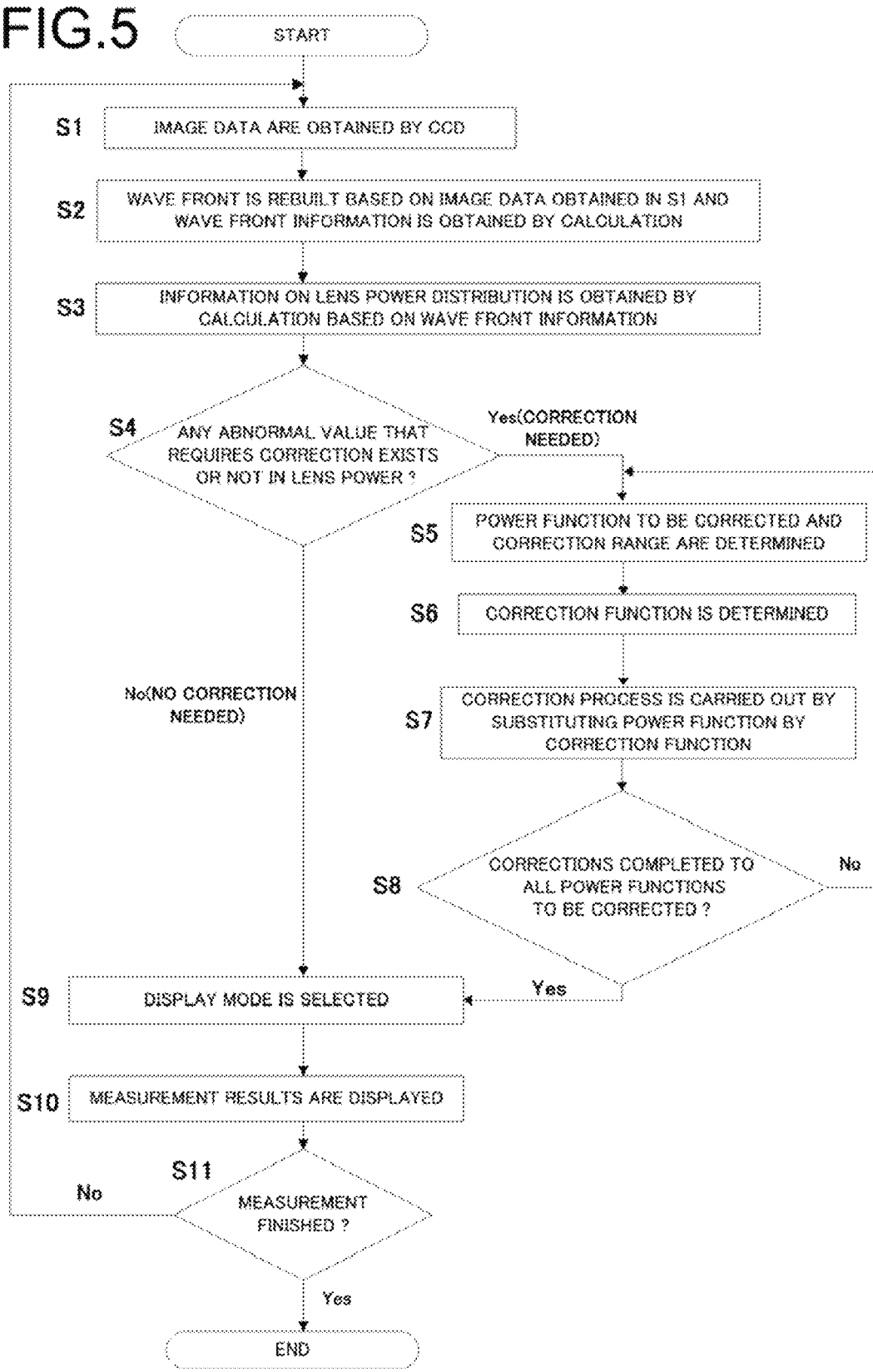
FIG. 5 is a view suitable for explaining a specific example of measurement procedure of a lens power distribution.

A specific example of measurement process of the lens power including the correction process described above will be explained below in reference to the process flow shown in FIG. 5. First, when the measurement of lens power starts, the wave-front aberration measurement device described above obtains data on measurement light reception by CCD 34 as optical property measurement information (S1). As the data on measurement light reception, information on the relative amount and direction of eccentricity of the measurement points (detection positions of the light transmitting through the contact lens) is obtained. Then, based on the light reception data including those of the amount and direction of eccentricity, wave front of the measurement light transmitted through the contact lens is rebuilt so as to obtain the wave-front information by calculation (S2). Such wave-front information can be obtained through calculation by determining the coefficient of the Zernike polynomials from the light reception data using the least squares method described earlier, for example. Next, based on the wave-front information expressed by the obtained Zernike polynomials and the like, lens power distribution information of the contact lens is obtained by calculation using differential calculus, vector operation and the like (S3).

Then, by verifying the lens power distribution information obtained as power distribution information, a judgment is made whether any abnormal value that requires correction exists or not (S4). This judgment can be made using the standard deviation, for example. More specifically, existence of any particular abnormal value is judged by calculating the average and standard deviation of lens powers on all the points obtained as lens power distribution information. For example, using the average value±3σ (or ±2σ or ±σ, σ: standard deviation) as an evaluation criterion, any lens power above or below such criterion value can be identified as abnormal. However, the correction process described below can be performed without making any judgment on the existence or nonexistence of abnormal values regardless thereof.

Then, when a judgment is made that corrections are needed (in case of 'Yes'), the power functions to be corrected are determined as correction target information in the following Step S5, while the correction range of each obtained power function is determined within a given region. More specifically, in the present embodiment, the power functions to be corrected are selected from among multi-order rational functions as the plurality of multi-order polynomials that were obtained based on the Zernike polynomials having coma components as described above. Since the rational function corresponding to the coma component of n=3rd order (first component) generally has the largest impact on abnormal values among the rational functions to be selected, it is desirable to have it included in the functions to be corrected. Also, since the impact on abnormal values seems to decrease as the number of order n increases to 5th (2nd component), 7th (3rd), 9th (4th), 11th (5th) and so forth, it is effective, for example, to select rational functions corresponding to up to the fifth or even sixth coma components as functions to be corrected. As to the range of coma components corresponding to the rational functions to be included in those to be corrected, it is desirable to set them changeable as appropriate depending on the need.

Also, the given region where the power functions selected as those to be corrected are substituted with the correction function by the smoothing member described above, that is, the correction range, is not particularly limited and can be set as appropriate, but for the purpose of making effective corrections of abnormal values, it is desirable to set it across both sides of the measurement optical system central axis 44. Also, for the purpose of avoiding any loss of necessary measurement information, it is preferably positioned in the center of the optical property measurement region, which is generally considered the contact lens's optical region, and preferably has a diameter not more than half that of the measurement region.

A specific correction range can be determined from a specific location, for example, within the radius of 2 mm around the measurement optical system central axis 44, or otherwise, by a specific optical property value such as the distance between the most closely positioned points straddling over the measurement optical system central axis 44 among the points where the lens power values calculated by coma components become zero. Preferably, in the multi-order polynomials selected by the correction target selecting member described above, the region between any two extremal portions that are the first, second and third closest to the measurement optical system central axis 44 on both sides thereof is determined as the given region across the both sides of the measurement optical system central axis 44 to be substituted with the correction function using the smoothing member described above, that is, the correction range. In each rational function, the 'extremal portion' means a point closer to an extremal point than to an inflection point, including the extremal point itself.

Also, as to which extremal portions to select as such correction range among those that are the first to third closest to the measurement optical system central axis 44, it is desirable to set the range such that the extremal portion at issue falls in the region having a radius within the range of ⅕ to ½ from the measurement optical system central axis 44 relative to the radius of the optical property measurement region. In the optical property measurement region, if such extremal portion is positioned in the proximity of less than ⅕ of the radius from the measurement optical system central axis 44, the correction effect is unlikely to be fully achieved. Meanwhile, if such extremal portion is positioned beyond ½ of the radius in the optical property measurement region, there is a risk of having an adverse effect of correction on the outer periphery of the measurement region where measurement errors are considered rather small. Therefore, among the multi-order polynomials selected as information to be corrected by the correction target selecting member as described above, those of smaller order number n should preferably have the region between extremal portions to be substituted with the correction function set between extremal portions with equal or less number of extremal points than those of larger order number n counting from the measurement optical system central axis 44, which is considered to be the lens central axis for measurement.

Figure 6:
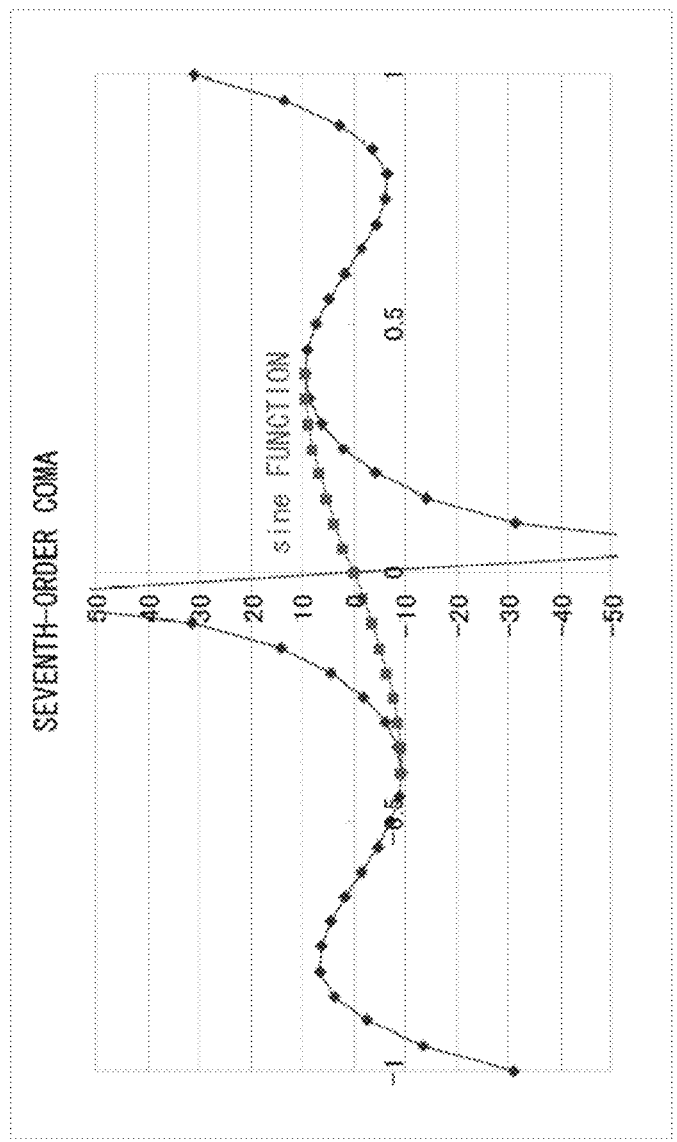
FIG. 6 is a graph showing an example where a central portion of a lens power function indicating seventh-order coma components has been smoothed.

For example, as to each of the power functions of 3rd, 5th, 7th and 9th order coma, extremal points closest to the measurement optical system central axis on both sides thereof are selected to define the correction range, while as to the power functions of 11th and 13th order coma, extremal points second closest to the measurement optical system central axis on both sides thereof are selected to define the correction range. FIG. 6 shows a power function of 7th coma having corrections to the area between extremal points closest to the measurement optical system central axis 44 on both sides thereof. Also, the extremal points can be determined by differentiating the power functions expressing the lens power by coma components and by finding points where the values of such differential functions become zero (see Table 3).

TABLE 3

[Differentiation of power functions of coma components]

| n | m | Item | RMS | form |
|---|---|---|---|---|
| 3 | 1 | Coma | $\sqrt{8}$ | $(9/r_{max}{}^3 + 2/(r^2 \cdot r_{max}))\cos(\theta + \theta_{3,1})$ |
| 5 | 1 | 2nd Coma | $\sqrt{12}$ | $(150r^2/r_{max}{}^5 - 36/r_{max}{}^3 - 3/(r^2 \cdot r_{max}))\cos(\theta + \theta_{5,1})$ |
| 7 | 1 | 3rd Coma | $\sqrt{16}$ | $(1225r^4/r_{max}{}^7 - 900r^2/r_{max}{}^5 + 90/r_{max}{}^3 - 4/(r^2 \cdot r_{max}))\cos(\theta + \theta_{7,1})$ |
| 9 | 1 | 4th Coma | $\sqrt{20}$ | $(7938r^6/r_{max}{}^9 - 9800r^4/r_{max}{}^7 + 3150r^2/r_{max}{}^5 - 180/r_{max}{}^3 - 5/(r^2 \cdot r_{max}))\cos(\theta + \theta_{9,1})$ |
| 11 | 1 | 5th Coma | $\sqrt{24}$ | $(45738r^8/r_{max}{}^{11} - 79380r^6/r_{max}{}^9 + 44100r^4/r_{max}{}^7 - 8400r^2/r_{max}{}^5 + 315/r_{max}{}^3 + 6/(r^2 \cdot r_{max}))\cos(\theta + \theta_{11,1})$ |
| 13 | 1 | 6th Coma | $\sqrt{28}$ | $(245338r^{10}/r_{max}{}^{13} - 548856r^8/r_{max}{}^{11} + 436590r^6/r_{max}{}^9 - 147000r^4/r_{max}{}^7 + 18900r^2/r_{max}{}^5 - 504/r_{max}{}^3 - 7/(r^2 \cdot r_{max}))\cos(\theta + \theta_{13,1})$ |

Further, within the correction range determined as described above, a correction function for correcting the power function is determined in the subsequent Step S6. This correction function used in the smoothing continuously connects both ends of the region determined as the correction range and is not particularly limited as long as it has no conspicuous peak, although a function that varies within the power range not exceeding the absolute value on either end of the region determined as the correction range is preferably adopted. More specifically, a linear function or a cubic function is adoptable, but a function that can be connected continuously to the power function at both ends of the correction range is preferable, and for example sine function, a sinc function (sinc) or a hyperbolic sine function (sinh) can favorably be adopted.

For example, the sine function adoptable as a correction function can be determined according to Equation 6 below. Table 4 shows power functions that can be adopted as a correction function in the correction range determined in Step S5 above for each power function of 3rd, 5th, 7th, 9th, 11th and 13th order coma.

$$V = \sum C_{Rn} \left[ VComa_n(r'_{max}, \theta) \sin\left(\frac{r}{r'_{max}} \cdot \frac{\pi}{2}\right) \cos(\theta + \theta_{n,1}) \right] * 2 -$$

$$-r'_{max} \leq r \leq r'_{max}$$

[Equation 6]

$r'_{max}$=PeakComa$_n$ $C_{Rn}$: Coefficient of $n^{th}$ order real aberration term $VComa_n(r'_{max}, \theta)$: Power function of $n^{th}$ order coma

*2: Regarding the formula in the rectangular box above, see the 'form' column in Table 4.

TABLE 4

[Power function of Coma components in the smoothing area]

| n | m | Item | RMS | form |
|---|---|---|---|---|
| 3 | 1 | Coma | $\sqrt{8}$ | $(9\text{Peak\_Coma}_3/r_{max}{}^3 - 2/(\text{Peak\_Coma}_3 \cdot r_{max})) \sin(\pi/2 \cdot r/\text{Peak\_Coma}_3) \cos(\theta + \theta_{3,1})$ |
| 5 | 1 | 2nd Coma | $\sqrt{12}$ | $(50\text{Peak\_Coma}_5{}^3/r_{max}{}^5 - 36\text{Peak\_Coma}_5/r_{max}{}^3 + 3/(\text{Peak\_Coma}_5 \cdot r_{max}))\sin(\pi/2 \cdot r/\text{Peak\_Coma}_5)\cos(\theta + \theta_{5,1})$ |
| 7 | 1 | 3rd Coma | $\sqrt{16}$ | $(245\text{Peak\_Coma}_7{}^5/r_{max}{}^7 - 300\text{Peak\_Coma}_7{}^3/r_{max}{}^5 + 90\text{Peak\_Coma}_7/r_{max}{}^3 - 4/(\text{Peak\_Coma}_7 \cdot r_{max}))\sin(\pi/2 \cdot r/\text{Peak\_Coma}_7)\cos(\theta + \theta_{7,1})$ |
| 9 | 1 | 4th Coma | $\sqrt{20}$ | $(1134\text{Peak\_Coma}_9{}^7/r_{max}{}^9 - 1960\text{Peak\_Coma}_9{}^5/r_{max}{}^7 + 1050\text{Peak\_Coma}_9{}^3/r_{max}{}^5 - 180\text{Peak\_Coma}_9/r_{max}{}^3 + 5/(\text{Peak\_Coma}_9 \cdot r_{max}))\sin(\pi/2 \cdot r/\text{Peak\_Coma}_9)\cos(\theta + \theta_{9,1})$ |
| 11 | 1 | 5th Coma | $\sqrt{24}$ | $(5082\text{Peak\_Coma}_{11}{}^9/r_{max}{}^{11} - 11340\text{Peak\_Coma}_{11}{}^7/r_{max}{}^9 + 8820\text{Peak\_Coma}_{11}{}^5/r_{max}{}^7 - 2800\text{Peak\_Coma}_{11}{}^3/r_{max}{}^5 + 315\text{Peak\_Coma}_{11}/r_{max}{}^3 - 6/(\text{Peak\_Coma}_{11} \cdot r_{max}))$ |
| 13 | 1 | 6th Coma | $\sqrt{28}$ | $(22308\text{Peak\_Coma}_{13}{}^{11}/r_{max}{}^{13} - 60984\text{Peak\_Coma}_{13}{}^9/r_{max}{}^{11} + 62370\text{Peak\_Coma}_{13}{}^9/r_{max}{}^9 - 29400\text{Peak\_Coma}_{13}{}^5/r_{max}{}^7 + 6300\text{Peak\_Coma}_{13}{}^3/r_{max}{}^5 - 504\text{Peak\_Coma}_{13}/r_{max}{}^3 + 7/(\text{Peak\_Coma}_{13} \cdot r_{max}))\sin(\pi/2 \cdot r/\text{Peak\_Coma}_{13})\cos(\theta + \theta_{13,1})$ |

Then, in the subsequent Step S7, a correction process is carried out by substituting the correction region determined as described above with each correction function and verifying the completion of corrections to the power functions of coma components of all orders to be corrected in Step S8 to complete the correction of abnormal values. FIG. 6 shows a specific condition wherein the area between extremal points closest to the measurement optical system central axis 44 on both sides thereof is substituted with a sine function as a correction function for the power function of 7th order coma.

After obtaining lens power distribution information with the measurement errors corrected by the correction function as described above, a display mode of the resulting information is selected through external inputs and the like in Step S9 to externally display the measurement results according to the condition corresponding to the selected display mode (S10). Thereafter, a selection is made whether or not to continue the measurement operation of the same or different contact lenses through external inputs (S11), and the operation ends whenever the measurement is regarded as finished.

Thus, the wave-front aberration measurement device of the present embodiment has a measurement results displaying member whereby measurement results of distribution of the lens power at each part of the contact lens 10 are determined and displayed based on the plurality of multi-order polynomials including those substituted with the correction functions. As to the range of selection for the external display of measurement results, it is conceivable to make selectable the screen display and print display, or planar 2D or volumetric 3D mapping image display and numerical value display, for example. However, the process of selecting and determining the display mode (S9) is not essential, and the resulting information can also be displayed in a preset display mode.

Figure 7:
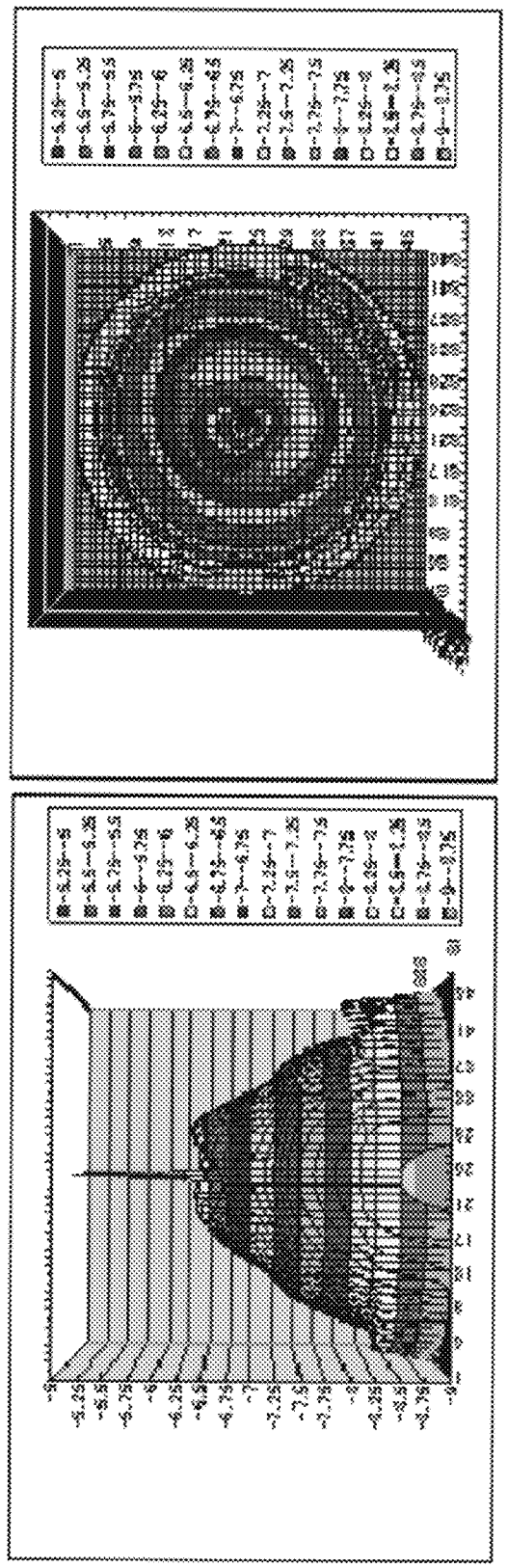
FIG. 7 is a view suitable for explaining a mapping screen display of measurement results of a lens power distribution of a contact lens before smoothing (correction).
Figure 8:
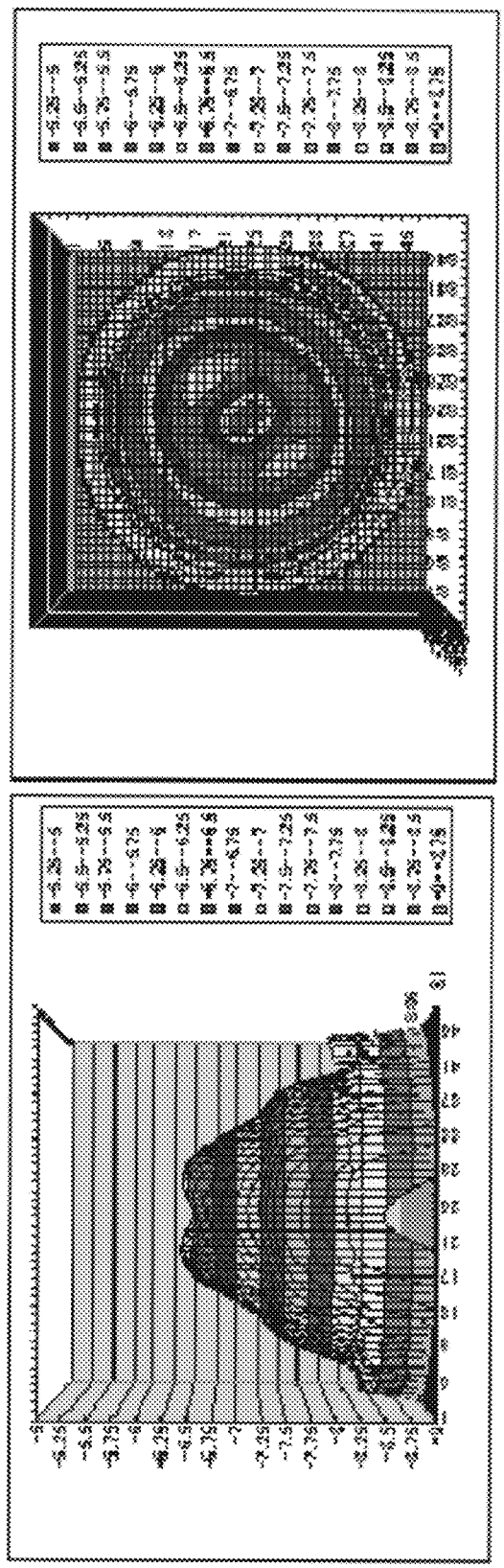
FIG. 8 is a view suitable for explaining a mapping screen display of measurement results of the lens power distribution of the contact lens after smoothing (correction).

FIGS. 7 and 8 show screens displaying mapped measurement results of power distribution of the contact lens 10. FIG. 7 indicates measurement results of lens power distribution of Comparative Example obtained in Steps S5 through S8 described above with no corrections in a 3D color mode, and FIG. 8 indicates measurement results of lens power distribution of Example obtained in Steps S5 through S8 with corrections in a 2D color mode by a mapping displaying member. The contact lens 10 used for the measurement is 2-week Acuvue (product name) by Johnson & Johnson with BC 8.70, DIA 14.0 and PWR −6.00.

In FIG. 7, a conspicuously protruding abnormal peak is observed at the center, whereas in FIG. 8 showing a state after corrections, a neat form of lens power distribution is exhibited, which is approximately symmetrical about the lens central axis without any abnormal peak at the center with almost no impact on the optical properties in the outer periphery.

Regarding the zonal measurement information described above, results of smoothing the lens power distribution of the contact lens using the reverse Gaussian filter are validated as Comparative Example as described below.

Figure 9:
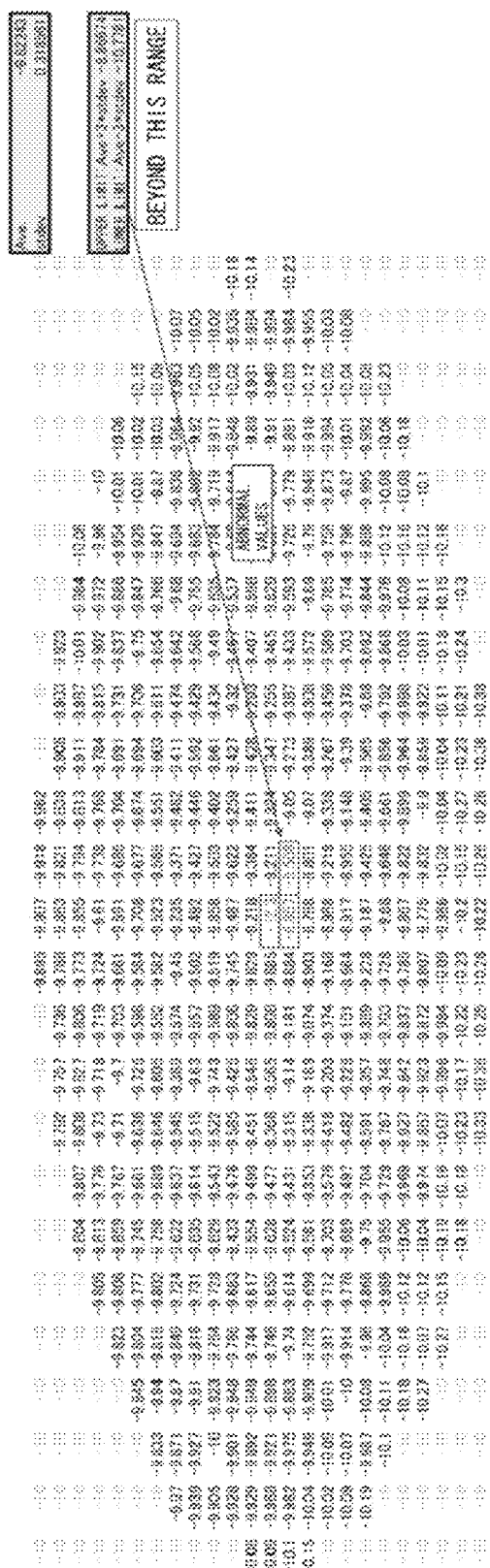
FIG. 9 is a view suitable for explaining an example of a lens power distribution before correction measured in accordance with the method of the present invention.

First, using OPAL300 (product name) by Spot Optics like Example described above, lens power distribution information shown in FIG. 9 are obtained from the information on wave-front inclination at each locally minimal part (zone) as zonal measurement information obtained for the contact lens 10. Then, the average and standard deviation of all lens powers are determined and those beyond the average±3σ are identified as abnormal values to be corrected. Such abnormal values are observed at three points at the center of the contact lens 10, as shown in FIG. 9. The lens power distribution information of FIG. 9 are displayed in FIG. 10 in color mapping in 2D and 3D. Thereafter, as shown in FIG. 11, the lens powers at the three points with abnormal values to be corrected are each substituted with an average value.

Figure 12:
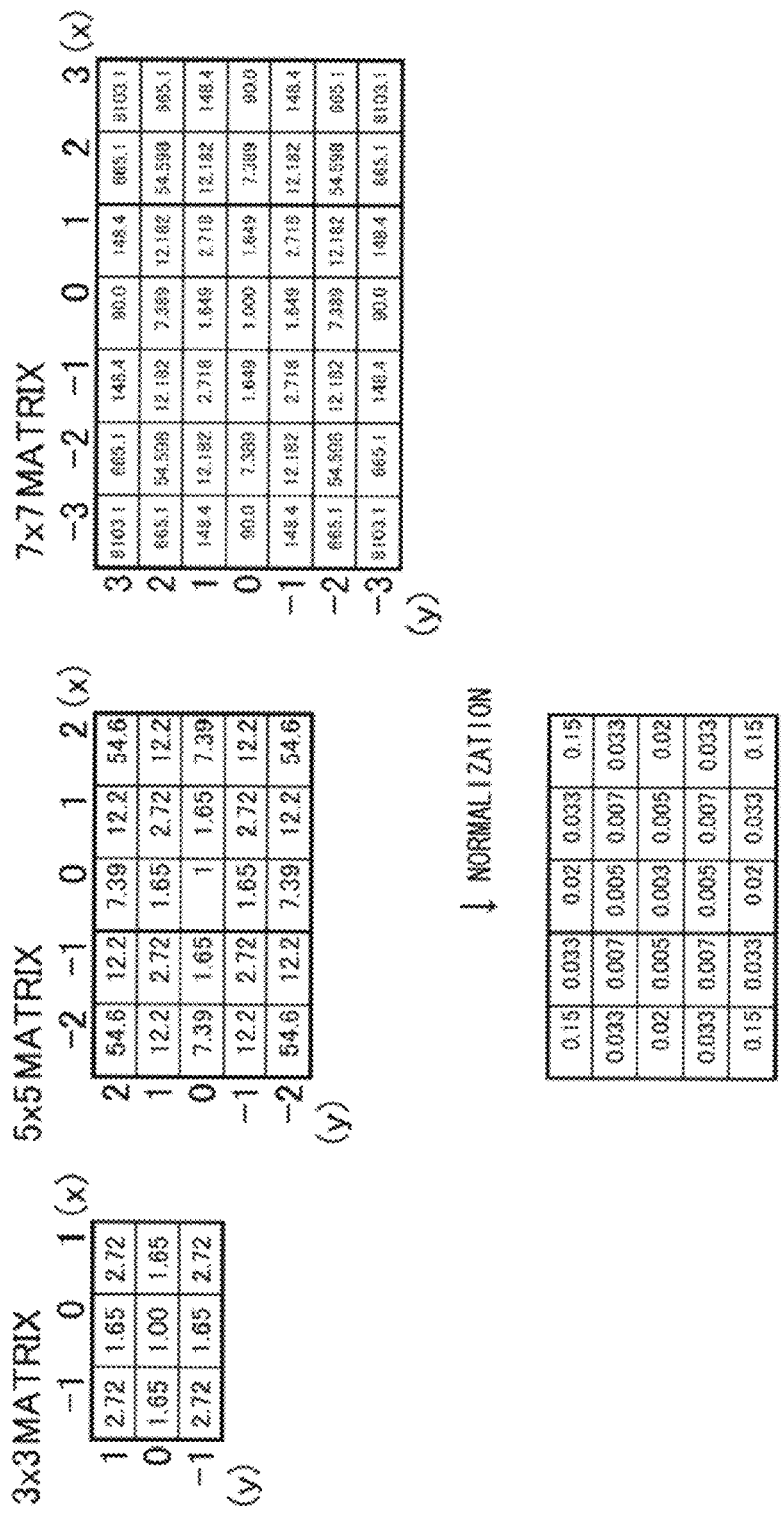
FIG. 12 is a view suitable for explaining an example of a reverse Gaussian filter applied to correction of the lens power distribution of FIG. 11 (Comparative Example).

Meanwhile, the Gaussian filter places much emphasis on the central value in the matrix because the lens powers are distributed in a manner of Gaussian function with a weighed moving average filter, which is not suitable for smoothing the abnormal values with extreme peaks and other values surrounding them. For that reason, the reverse Gaussian filter is adopted as shown in FIG. 12. In other words, an inverse of Gauss function is adopted as a filter, as expressed in Equation 7 below, after being normalized to make the sum of matrix ratios equal to one.

Reverse Gauss function: $f^{-1}(x,y)=1/f(x,y)$ [Equation 7]

Using the filter where the correction function is defined in a matrix form as described above, the value of each cell in such filter is multiplied by the original data value corresponding to each cell in the lens power distribution shown in FIG. 11. After performing the multiplication for all the cells, the total sum of those products is substituted for the original value in the targeted cell. This procedure is repeated for all the data within Zone 1 (data area including the central value of the map and the surrounding values).

Upon completion of the above process in Zone 1, further processes in Zones 2, 3, 4, 5 . . . are carried out for additional cells. The number of zones to be processed can be preset, and data of up to Zone 4 are processed in the present Comparative Example. The results are shown in FIG. 13.

From the results shown in FIG. 13, some changes in the measured lens powers are found in a comparatively wide central area including the abnormal peaks near the center despite the fact that a few peak values still remain in the central area, which makes us infer that the measurement accuracy is getting worse.

After the smoothing process described above by filtering in all the preset zones, it is conceivable to repeat the smoothing process in order to minimize the central abnormal peaks. That is, for the lens power distribution information obtained by the smoothing process shown in FIG. 13, the average and standard deviation of all lens powers are determined again and those beyond the average±3σ are identified as abnormal values to be corrected, which are substituted with the average values while the filtering process is performed in Zones 1, 2 . . . using the reverse Gaussian filter.

Figure 14:
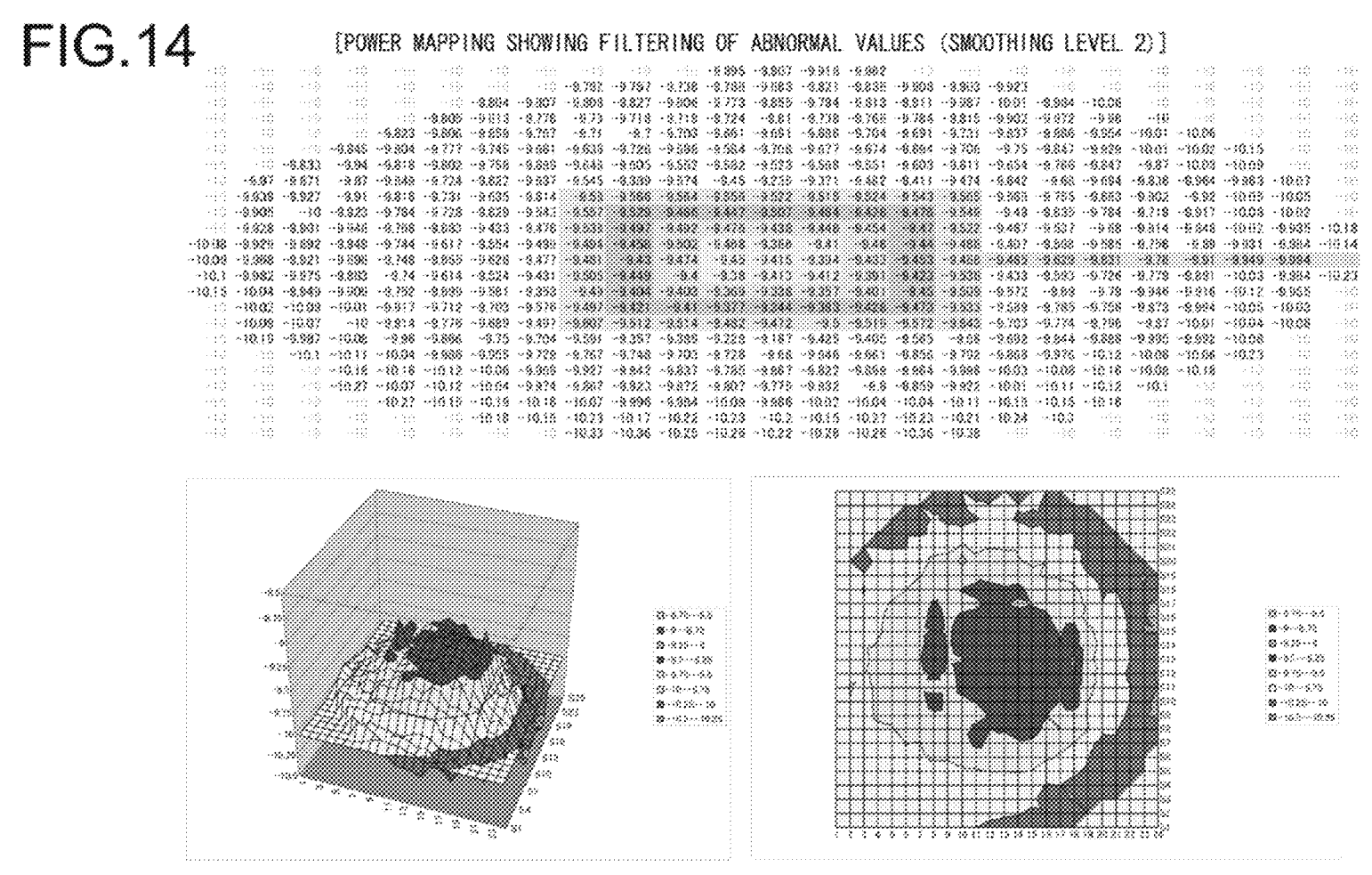

For example, as a result of the second smoothing process, lens power distribution information is obtained as shown in FIG. 14 as another Comparative Example. Those results shown in FIG. 14 reveal that the repeated smoothing processes could restrict the abnormal peaks but the measurement accuracy in the surrounding area has further deteriorated.

Thus, compared to the process of correction by smoothing using the reverse Gaussian filter shown as Comparative Example, the correction process according to the present invention described in the above embodiment has an obvious advantage. In other words, it is conceivable that the lens power distribution information of the contact lens 10 obtained through the correction process according to the present invention described above is able to effectively eliminate the abnormal peaks at the center, which are apparent measurement errors while avoiding deterioration of measurement accuracy in the periphery and have achieved enhanced visibility and understandability while maintaining high reliability in terms of accuracy.

Especially in the above embodiment according to the present invention, the lens surface can be recognized not locally but as a whole to capture the lens power by means of showing the power distribution of the contact lens in a state of overlap between the position (x, y) and the plurality of multi-order polynomials of lens parameters. This allows us to assume the focal point to be the intersection between ray lights passing through the lens and the optical central axis of the contact lens, and the measurement results of lens power at each part of the contact lens to be an inverse of focal distance between the concave inner face of the contact lens and the focal point on the optical central axis. Therefore, for the contact lens that does not significantly vary the intersection of visual axes on the lens surface following the eyeball movements, the lens powers and even the distribution thereof at each part can be measured with more effective accuracy in practical use.

In addition, in the above embodiment according to the present invention, extraction of specific multi-order polynomials associated with the abnormal peaks is enabled by expressing the contact lens power distribution divided into a plurality of multi-order polynomials. Especially for a contact lens as an industrial product, abnormal peaks that occur in lens power measurements are considered to be measurement errors, but it is extremely difficult to correct just specific measurement errors. Here, the method of present invention focuses on the characteristics of the measurement errors of the contact lens, and by applying specific corrections to multi-order polynomials having a hyperbolic function area associated with the positive and negative abnormal peaks on both sides of the lens central axis, it is now possible to effectively correct the measurement errors while minimizing adverse effects on the overall measurement accuracy as much as possible.

Also, according to the present invention, measurement errors are efficiently corrected to achieve high-precision measurement results of lens powers, which are displayed after being obtained from the measurements following the method of present invention. The contact lens relating to the present invention is able to capture accurate data on lens powers based on such display.

In other words, by displaying on the contact lens 10 the optical properties obtained from the lens power distribution information determined through the measurement information correction process according to the present invention described above, enhancement of such contact lens 10 can be achieved in terms of reliability of optical properties and commercial values. The form of display is not particularly limited, but a direct marking by laser beam or pigments on the contact lens 10, providing attachments thereto or individually wrapped packages thereof, and displaying a printed text on the outer casing are all feasible. Also, the measurements of the optical properties according to the present invention to be displayed on the contact lens 10 is not limited to those performed by plant inspection during the manufacturing process, but they can be performed, for example, in the process of verification of the lens power of the contact lens 10 by the optometrist on behalf of the user/patient or confirmation of the lens power of the contact lens 10 delivered at the distributor. The package labeling of lens powers as measurement results would then be performed in a form of specifying the contact lens 10 on the medical chart of each user/patient or indicating the specifications of the contact lens 10 to be sold by the distributor.

Embodiments of the present invention have been described above, but the present invention is not to be interpreted in a limited way by those specific descriptions and are implementable with various modifications, revisions, improvements and the like based on the knowledge of those skilled in the art, and any such aspect of implementation is included in the range of the present invention as long as it does not deviate from the spirit thereof.

For example, it is possible to apply the method of present invention to zonal measurement information as the contact lens power distribution information. In that case, a smoothing process using a correction function can be applied, for example, to the mapped values of lens powers (lens power distribution information) found in a given area at the center of the lens including the abnormal peak values selected using the standard deviation and the like as has been done in the above embodiment. In other words, in the given area at the center of the lens, for example, the abnormal peak values and the lens powers surrounding them can be effectively smoothed to display the measurement results of the lens powers by means of changing the mapped lens power values in each zone located on the radial line of the lens extending through the measurement points of the abnormal peak values.

| KEYS TO SYMBOLS | | |
|---|---|---|
| 10: Contact lens; | 12: Concave inner face; | 44: Measurement optical system central axis; |
| | L: Lens central axis; | P: Focal point |

The invention claimed is:

1. A lens power measurement device that measures a power distribution of a lens that keeps intersection of visual axes at nearly a constant location on a lens surface, comprising:
    a power distribution calculating member that determines power distribution information of the lens based on optical property measurement information of the lens;
    a correction target selecting member that selects correction target information including positive and negative abnormal peaks on both sides of a lens central axis in a lens central area from among the power distribution information obtained by the power distribution calculating member; and
    a smoothing member that determines a corrected lens power by substituting the correction target information selected by the correction target selecting member with a correction function that smoothes out a region across the both sides of the lens central axis.

2. The lens power measurement device according to claim 1, wherein the optical property measurement information of the lens comprises a wave-front aberration measurement information of the lens obtained by a ray tracing method.

3. The lens power measurement device according to claim 1, wherein regarding the smoothing member, the region across the both sides of the lens central axis to be substituted with the correction function is positioned in a center of a measurement region of the power distribution of the lens and has a diameter not more than half that of the measurement region.

4. The lens power measurement device according to claim 1, wherein
    the power distribution calculating member determines the power distribution information of the lens as a plurality of multi-order polynomials,
    the correction target selecting member selects from among the multi-order polynomials a multi-order polynomial containing a hyperbolic function area associated with the positive and negative abnormal peaks on the both sides of the lens central axis as the correction target information, and the smoothing member substitutes the multi-order polynomial selected by the correction target selecting member with the correction function that contains the hyperbolic function area and smoothes out a given region across the both sides of the lens central axis.

5. The lens power measurement device according to claim 4, wherein the multi-order polynomials obtained by the power distribution calculating member are multi-order rational functions determined from Zernike polynomials.

6. The lens power measurement device according to claim 4, wherein regarding the smoothing member, the region across the both sides of the lens central axis to be substituted with the correction function is a region between any two extremal portions that are first, second and third closest to the lens central axis on the both sides of the lens central axis in the multi-order polynomial selected by the correction target selecting member.

7. The lens power measurement device according to claim 6, wherein the correction target selecting member selects a plurality of the multi-order polynomials, and among the multi-order polynomials, those of smaller order number have the region between the extremal portions to be substituted with the correction function in the smoothing member set between extremal portions of equal or less number counting from the lens central axis than those of larger order number.

8. The lens power measurement device according to claim 4, further comprising a measurement results displaying member that determines an intersection between a light ray incident to each part of the lens and an optical central axis of the lens as a focal point based on the plurality of multi-order polynomials including the multi-order polynomial substituted with the correction function, and displays an inverse of a distance between a concave inner face of the lens and the focal point on the optical central axis as a lens power at the each part of the lens.

9. The lens power measurement device according to claim 1, wherein the correction function adopted in the smoothing member is one of a sine function and a sinc function.

10. The lens power measurement device according to claim 1, further comprising a mapping displaying member that displays in a mapping the lens power at the each part of the lens using a value that reflects the corrected lens power determined by the smoothing member in at least one display mode of two-dimensional and three-dimensional views.

11. A lens power measurement method comprising:
determining power distribution information that indicates a power distribution of a lens based on optical property measurement information of the lens;
selecting correction target information including positive and negative abnormal peaks on both sides of a lens central axis in a lens central area from among the power distribution information; and then
determining a corrected lens power by substituting the selected correction target information with a correction function that smoothes out a region across the both sides of the lens central axis.

12. The lens power measurement method according to claim 11, wherein the optical property measurement information of the lens comprises a wave-front aberration measurement information of the lens obtained by a ray tracing method.

13. The lens power measurement method according to claim 11, wherein the region across the both sides of the lens central axis to be substituted with the correction function is positioned in a center of a measurement region of the power distribution of the lens and has a diameter not more than half that of the measurement region.

14. The lens power measurement method according to claim 11, wherein the corrected lens power is determined by
determining a plurality of multi-order polynomials based on the optical property measurement information of the lens as the power distribution information that indicates the power distribution of the lens,
selecting a multi-order polynomial containing a hyperbolic function area associated with the positive and negative abnormal peaks on the both sides of the lens central axis as the correction target information from among the multi-order polynomials, and
substituting the selected multi-order polynomial with the correction function that contains the hyperbolic function area and smoothes out a given region across the both sides of the lens central axis.

15. The lens power measurement method according to claim 14, wherein the multi-order polynomials that are determined based on the optical property measurement information of the lens and that indicate the power distribution of the lens are multi-order rational functions determined from Zernike polynomials.

16. The lens power measurement method according to claim 14, wherein the region across the both sides of the lens central axis to be substituted with the correction function is a region between any two extremal portions that are first, second and third closest to the lens central axis on the both sides of the lens central axis in the selected multi-order polynomial.

17. The lens power measurement method according to claim 16, wherein a plurality of the multi-order polynomials are selected, and among the multi-order polynomials, those of smaller order number have the region between the extremal portions to be substituted with the correction function in the smoothing member set between extremal portions of equal or less number counting from the lens central axis than those of larger order number.

18. The lens power measurement method according to claim 14, wherein
based on the plurality of multi-order polynomials including the multi-order polynomial substituted with the correction function, an intersection between a light ray incident to each part of the lens and an optical central axis of the lens is determined as a focal point, and
an inverse of a distance between a concave inner face of the lens and the focal point on the optical central axis is obtained as a measurement result of a lens power at the each part of the lens.

19. The lens power measurement method according to claim 11, wherein the correction function is one of a sine function and a sinc function.

20. The lens power measurement method according to claim 11, wherein measurement results of the power distribution of the lens are displayed by displaying in a mapping the lens power at the each part of the lens using a value that reflects the corrected lens power in at least one display mode of two-dimensional and three-dimensional views.

* * * * *

UNITED STATES PATENT AND TRADEMARK OFFICE
CERTIFICATE OF CORRECTION

PATENT NO. : 9,778,136 B2  
APPLICATION NO. : 14/396489  
DATED : October 3, 2017  
INVENTOR(S) : Hiroaki Suzuki et al.

Page 1 of 1

It is certified that error appears in the above-identified patent and that said Letters Patent is hereby corrected as shown below:

In the Specification

In Column 8, Lines 37-41, change:

$$C_{\frac{n(n+2)+m}{2}} : \frac{n(n+2)+m}{2} \; _{\frac{n(n+2)+m}{2}} \frac{n(n+2)+m}{2} \text{th coefficient}$$

To:

$$C_{\frac{n(n+2)+m}{2}} : \frac{n(n+2)+m}{2} \text{th coefficient}$$

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*